(12) United States Patent  (10) Patent No.: US 9,224,226 B2
Yamada et al.  (45) Date of Patent: Dec. 29, 2015

(54) IMAGE DISPLAY DEVICE FOR DIRECT DRAWING APPARATUS, AND RECORDING MEDIUM

(75) Inventors: Ryo Yamada, Kyoto (JP); Itaru Furukawa, Kyoto (JP)

(73) Assignee: Screen Holdings Co., Ltd., Kyoto (JP)

( * ) Notice: Subject to any disclaimer, the term of this patent is extended or adjusted under 35 U.S.C. 154(b) by 548 days.

(21) Appl. No.: 13/615,154

(22) Filed: Sep. 13, 2012

(65) Prior Publication Data

US 2013/0083050 A1   Apr. 4, 2013

(30) Foreign Application Priority Data

Sep. 30, 2011 (JP) ................... 2011-217064
Sep. 30, 2011 (JP) ................... 2011-217065

(51) Int. Cl.
*G06T 11/40* (2006.01)
(52) U.S. Cl.
CPC ..................................... *G06T 11/40* (2013.01)
(58) Field of Classification Search
None
See application file for complete search history.

(56) References Cited

U.S. PATENT DOCUMENTS

| | | | |
|---|---|---|---|
| 4,931,956 A * | 6/1990 | Stapleton | 345/428 |
| 6,069,971 A | 5/2000 | Kanno et al. | |
| 7,890,203 B2 | 2/2011 | Akagawa et al. | |
| 2002/0060734 A1 * | 5/2002 | Hino et al. | 348/144 |
| 2003/0058687 A1 | 3/2003 | Kimura | |
| 2005/0231123 A1 | 10/2005 | Kimura | |
| 2005/0285054 A1 | 12/2005 | Inoue et al. | |
| 2008/0205767 A1 | 8/2008 | Hoshino et al. | |
| 2008/0244308 A1 | 10/2008 | Yamada et al. | |
| 2009/0034833 A1 | 2/2009 | Ozaki et al. | |
| 2010/0079177 A1 | 4/2010 | Kimura | |
| 2011/0106287 A1 | 5/2011 | Akagawa et al. | |
| 2011/0169008 A1 | 7/2011 | Kimura | |
| 2013/0234195 A1 | 9/2013 | Kimura | |

FOREIGN PATENT DOCUMENTS

CN    101198908 A    6/2008
JP    H08-305923 A   11/1996
(Continued)

OTHER PUBLICATIONS

Office Action issued in Taiwanese Application No. 101116997 dated Aug. 15, 2014, with English translation.
(Continued)

*Primary Examiner* — James A Thompson
(74) *Attorney, Agent, or Firm* — McDermott Will & Emery LLP

(57) ABSTRACT

An image display device for direct drawing apparatus for performing direct drawing comprising: an acquisition part for acquiring design data in a vector format describing the pattern; a specified parameter setting part for setting a specified parameter to be used for RIP development of the design data; a processing area setting part for setting a processing area of the design data to be subjected to RIP development; a display RIP development part for performing RIP development of a portion of the design data, which corresponds to the processing area, by using the specified parameter, to thereby obtain a specified image; and a display part for visibly displaying the specified image, wherein the RIP development performed by the display RIP development part is a display RIP development in which the amount of processed data is smaller than that in drawing RIP development for the direct drawing.

14 Claims, 14 Drawing Sheets

(56) References Cited

FOREIGN PATENT DOCUMENTS

| | | |
|---|---|---|
| JP | H09-265546 A | 10/1997 |
| JP | H10-177589 A | 6/1998 |
| JP | 2004-000505 A | 1/2004 |
| JP | 2004-056068 A | 2/2004 |
| JP | 2005-136121 A | 5/2005 |
| JP | 2005-136594 A | 5/2005 |
| JP | 2005-340438 A | 12/2005 |
| JP | 2005-345749 A | 12/2005 |
| JP | 2006-330184 A | 12/2006 |
| JP | 2007-313114 A | 12/2007 |
| JP | 2007-318555 A | 12/2007 |
| JP | 2008-33364 A | 2/2008 |
| JP | 2008-242356 A | 10/2008 |
| JP | 2008-242885 A | 10/2008 |
| JP | 2008-277730 A | 11/2008 |
| JP | 2009-111148 A | 5/2009 |
| JP | 4450769 B2 | 4/2010 |
| JP | 2010-172462 A | 8/2010 |
| TW | 200900684 A | 1/2009 |

OTHER PUBLICATIONS

Japanese Office Action dated May 12, 2015 for Japanese Patent Application No. 2011-217064, 8 pages including translation.

Japanese Office Action dated Jun. 16, 2015 issued in corresponding Japanese Patent Application No. 2011-217065, with English translation.

English translation of Taiwanese Office Action dated Mar. 23, 2015, based on Japanese translation attached thereto.

Japanese Office Action issued in Japanese Application No. 2011-217064 dated Oct. 6, 2015, with English Translation.

* cited by examiner

F I G . 1
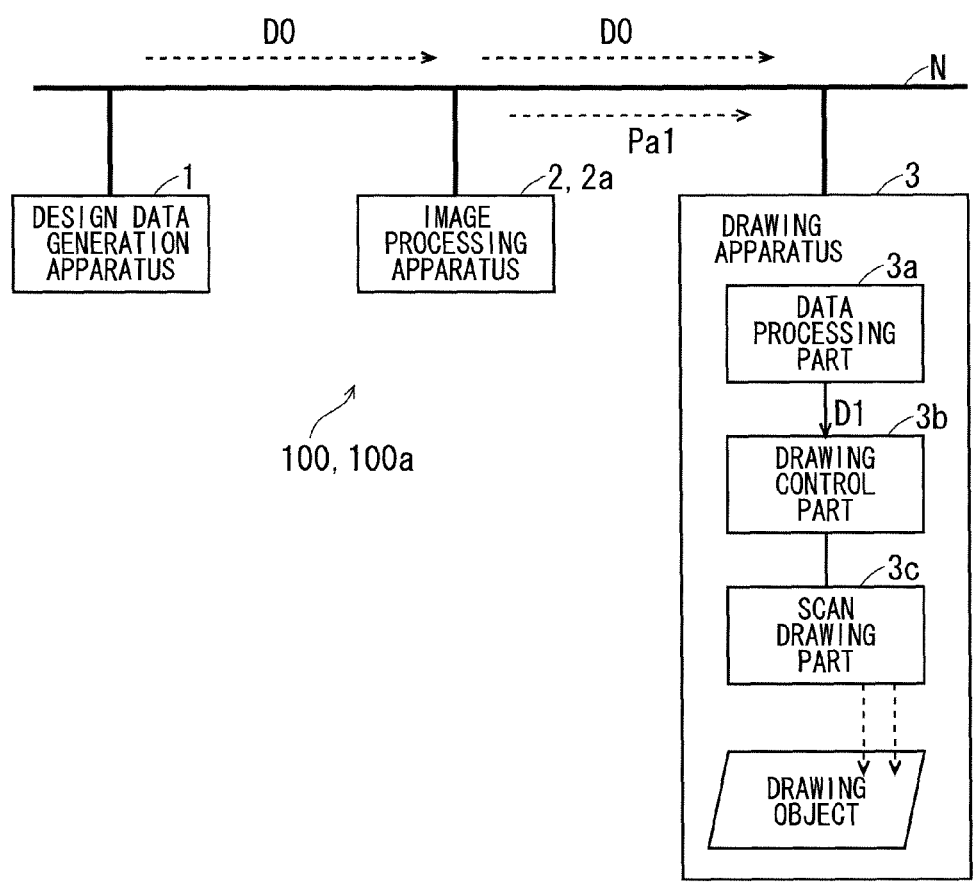

F I G . 4
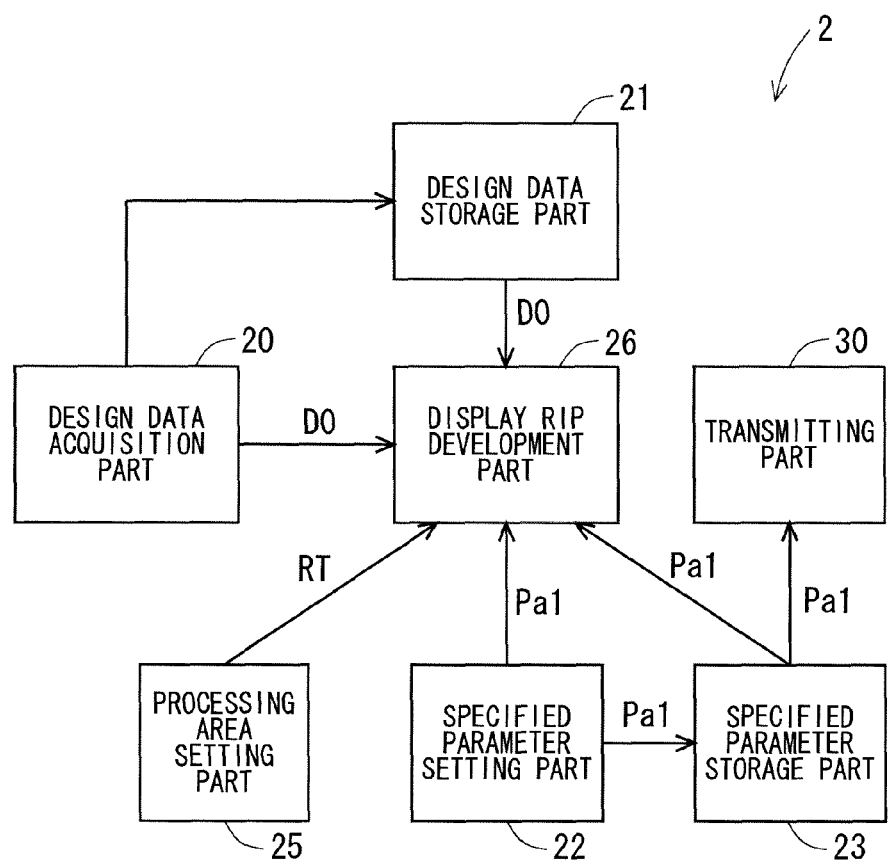

F I G . 7
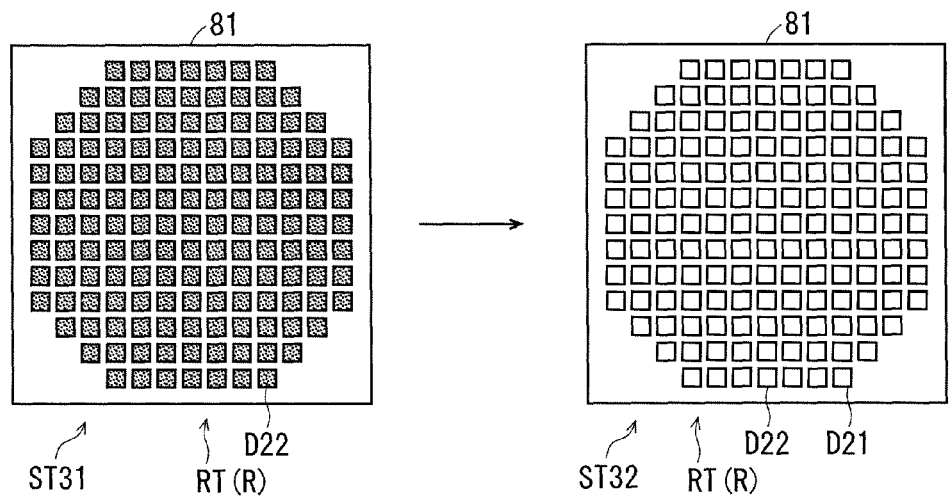
F I G . 8
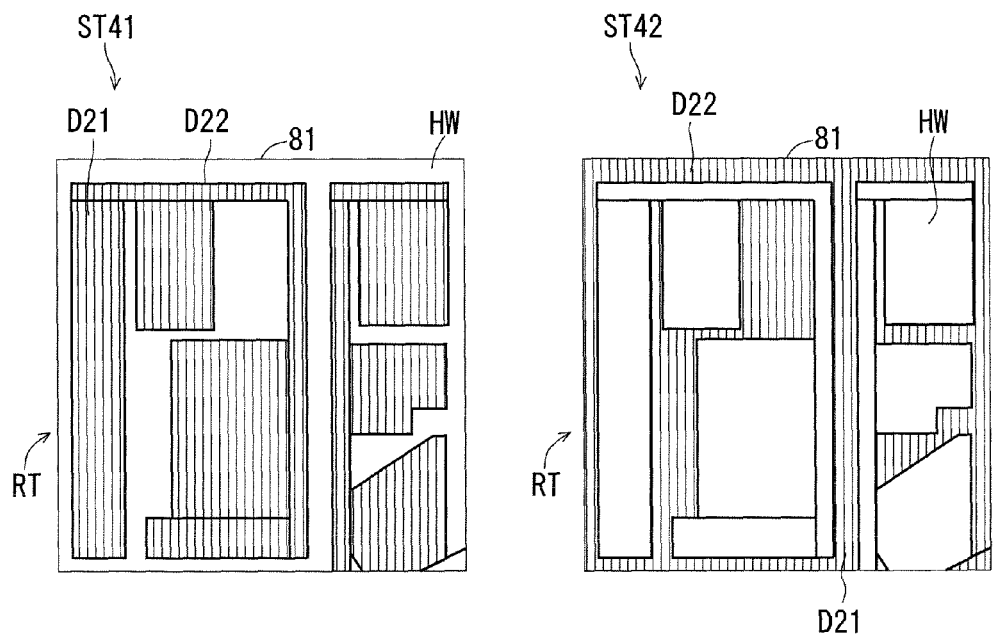

FIG. 10
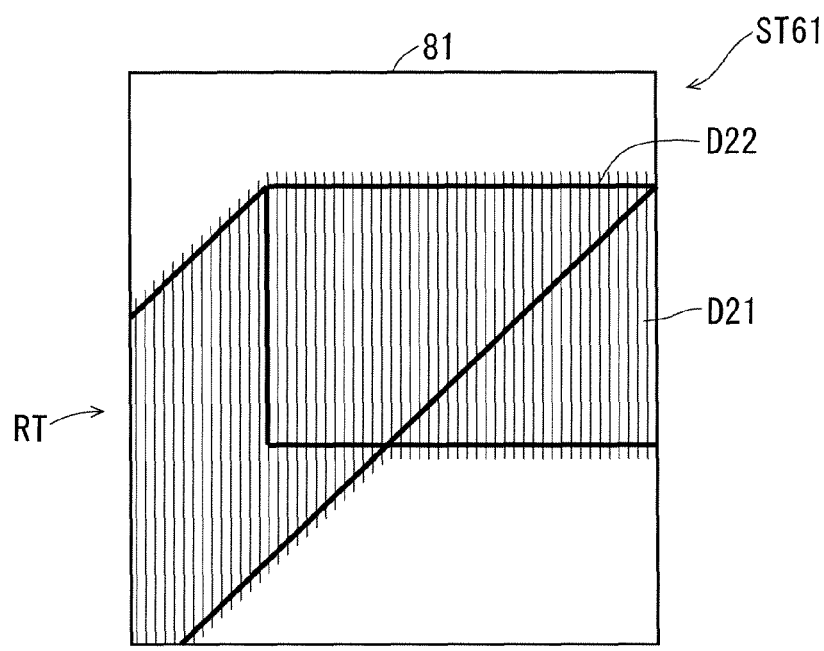
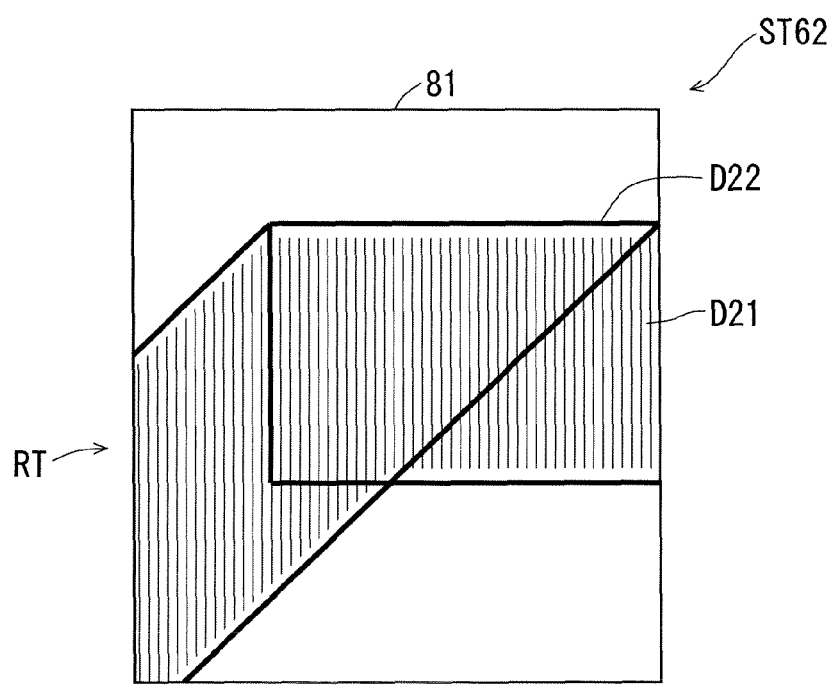

FIG. 11
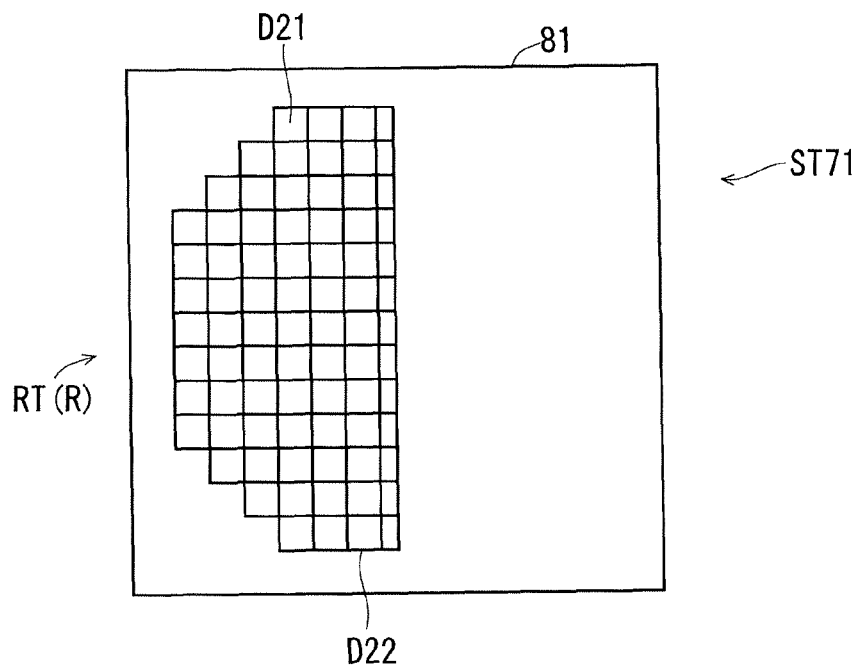
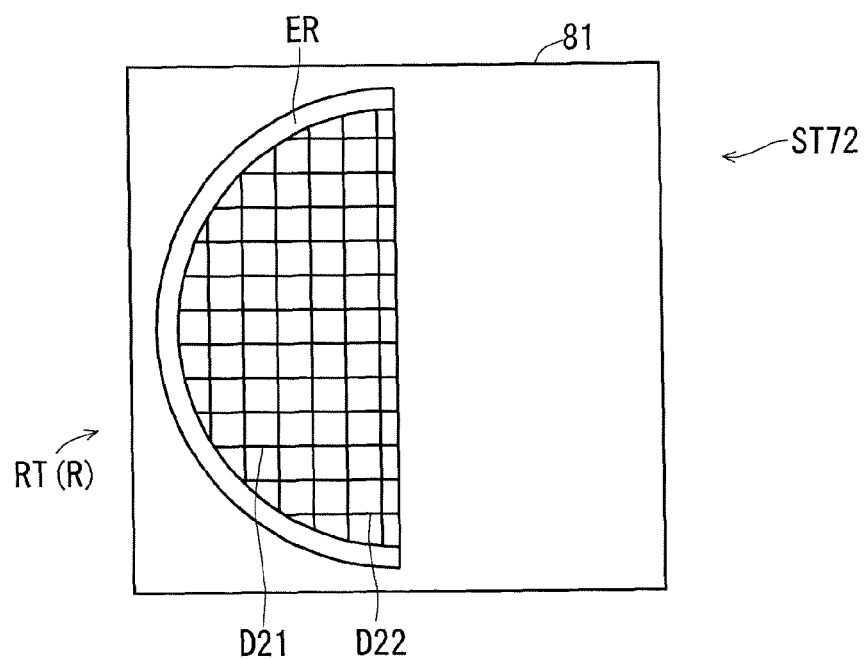

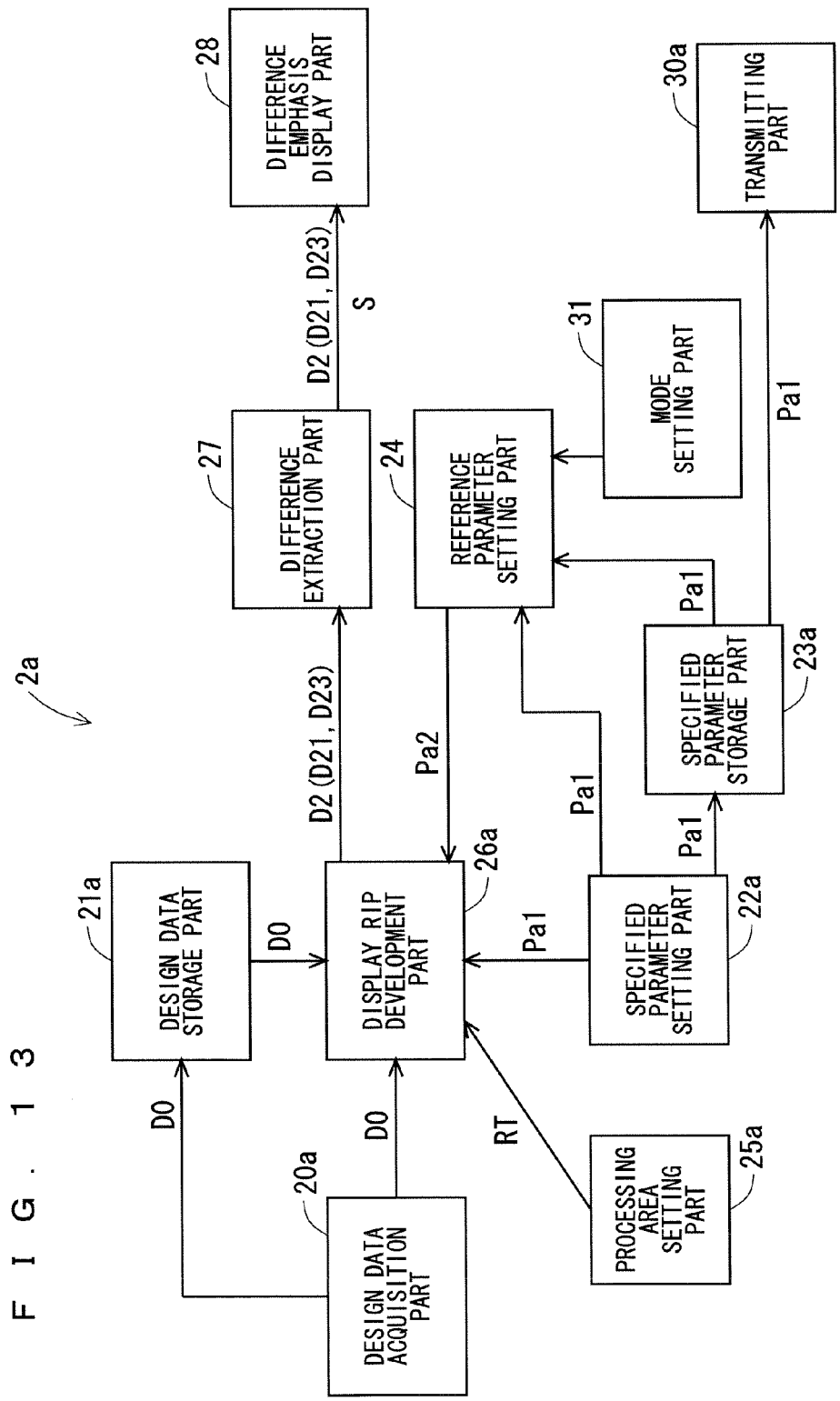
F I G . 1 3

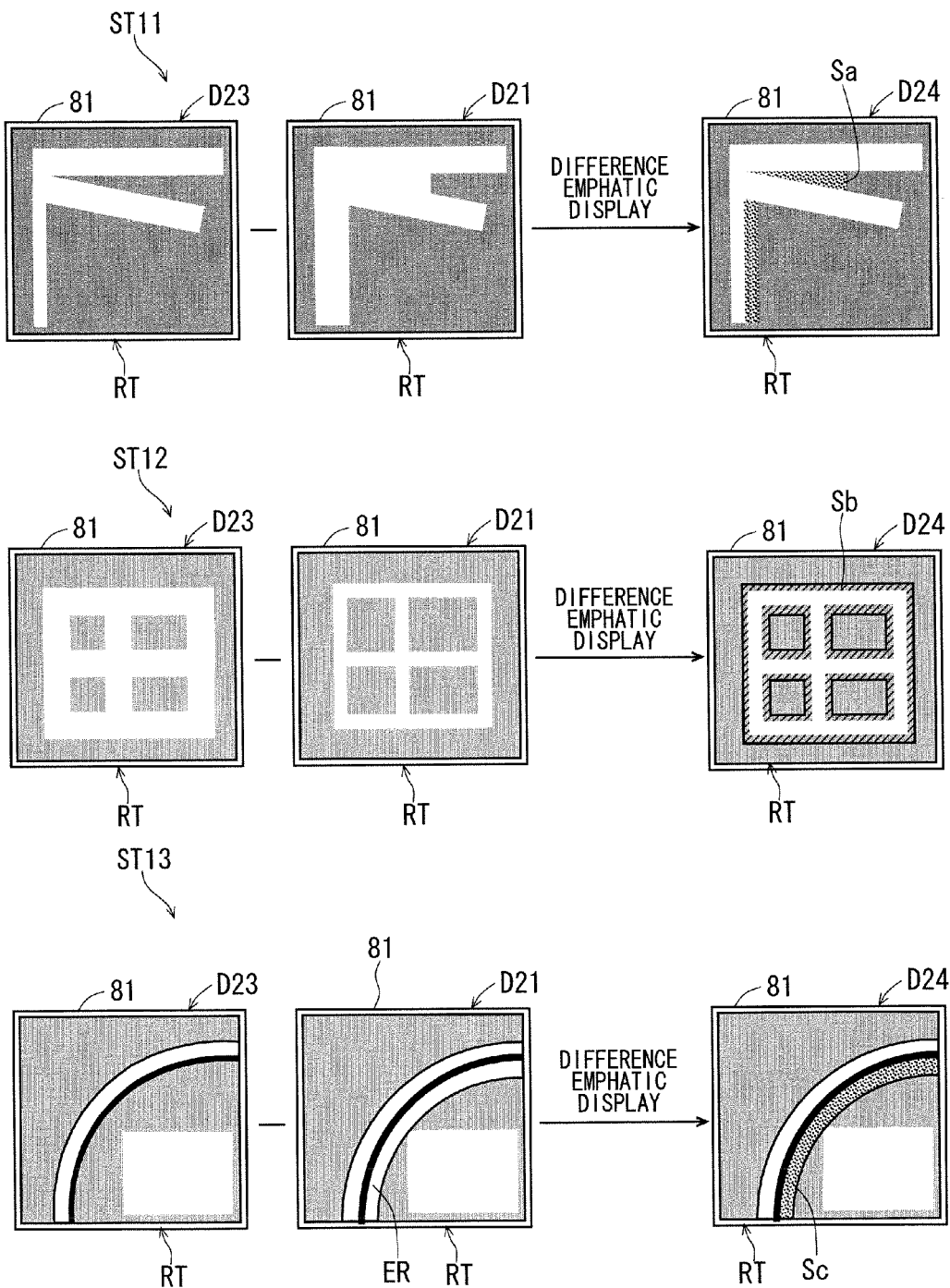

IMAGE DISPLAY DEVICE FOR DIRECT DRAWING APPARATUS, AND RECORDING MEDIUM

BACKGROUND OF THE INVENTION

1. Field of the Invention

The present invention relates to a technique for displaying drawing data to be used in a direct drawing apparatus in advance.

2. Description of the Background Art

In recent years, a mode (hereinafter, referred to as a "direct drawing mode") for directly drawing a pattern on a drawing object such as a semiconductor substrate or the like from design data in a vector format which is designed by using CAD (Computer Aided Design) or the like, without using any photomask.

In an apparatus (hereinafter, referred to as a "direct drawing apparatus") for drawing a pattern in the direct drawing mode, drawing is performed by using raster data which is generated by performing RIP (Raster Image Processing) development of the design data in the vector format.

In a case of using such a direct drawing mode, it is necessary to check the raster data itself to determine whether the RIP development is performed properly or not.

Japanese Patent Application Laid Open Gazette No. 2008-277730, for example, discloses a technique in which at least one of the design data in the vector format and run-length data which is obtained by performing RIP development of the whole of design data is converted into comparable data and both data in comparable data format are compared with each other, to thereby detect whether there is a difference between these data or not.

Further, Japanese Patent Application Laid Open Gazette No. 2006-330184, for example, discloses a technique in which the whole of design data in the vector format is once subjected to RIP development, to thereby display the whole of RIP data with low resolution, and an area thereof in which, particularly, something like shape and/or the like is needed to be checked is displayed, being enlarged with high resolution. An operator enlarges the RIP data of the specified area and visually checks the RIP data.

Such RIP development is performed on the basis of a predetermined RIP parameter which is set in advance. An operator, however, sometimes needs to change the RIP parameter immediately before the drawing operation because of, for example, conditions for a process, such as conditions of an etching solution, constraints due to specs (specifications) of a direct drawing apparatus, change of the principle of the drawing, or the like. In such a case, since there is a possibility of making an error in setting a new RIP parameter, or the like, it is necessary for the operator to immediately check a pattern represented by image data which is obtained by RIP development on the basis of a newly-set RIP parameter.

In the techniques disclosed in Japanese Patent Application Laid Open Gazette Nos. 2008-277730 and 2006-330184, it is not possible to immediately check the image data which is obtained by the RIP development on the basis of the newly-set RIP parameter since it takes long perform the RIP development, it takes time and effort to set a RIP parameter, or the like.

SUMMARY OF THE INVENTION

The present invention is intended for an image display device for direct drawing apparatus for performing direct drawing of a predetermined pattern on a drawing object by scanning with a drawing beam. According to a first aspect of the present invention, the image display device for direct drawing apparatus comprises an acquisition part for acquiring design data in a vector format describing the pattern, a specified parameter setting part for setting a specified parameter to be used for RIP development of the design data, a processing area setting part for setting a processing area of the design data to be subjected to RIP development, a display RIP development part for performing RIP development of a portion of the design data, which corresponds to the processing area, by using the specified parameter, to thereby obtain a specified image, and a display part for visibly displaying the specified image, and in the apparatus of the invention, the RIP development performed by the display RIP development part is a display RIP development in which the amount of processed data is smaller than that in drawing RIP development for the direct drawing.

By the first aspect of the present invention, since the specified image obtained by the display RIP development in which the amount of processed data is smaller than that in the drawing RIP development is displayed, it is possible to immediately perform the RIP development every time when a specified parameter is set.

According to a second aspect of the present invention, in the image display device for direct drawing apparatus, preferably, in response to update of the specified parameter, the display RIP development is performed and display content on the display part is updated.

By the second aspect of the present invention, since the display RIP development is performed and the display content is updated in response to the update of the specified parameter, it is possible to more immediately check the image after the RIP development.

According to a third aspect of the present invention, in the image display device for direct drawing apparatus, preferably, the display RIP development part performs the display RIP development with first resolution when the processing area corresponds to a partial area of the pattern and performs the display RIP development with second resolution when the processing area corresponds to an entire area of the pattern, and the second resolution is lower than the first resolution.

By the third aspect of the present invention, the display RIP development is performed with the first resolution when the processing area corresponds to a partial area of the pattern and the display RIP development is performed with the second resolution lower than the first resolution when the processing area corresponds to an entire area of the pattern. Therefore, it is possible to rapidly perform the display RIP development.

According to a fourth aspect of the present invention, in the image display device for direct drawing apparatus, preferably, the specified image obtained by the display RIP development is displayed on the display part, being aligned with a pattern corresponding to the design data.

By the fourth aspect of the present invention, the image obtained by the display RIP development is displayed on the display part, being aligned with the pattern corresponding to the design data. Therefore, it is possible to easily compare the pattern represented by the design data with the image obtained by the display RIP development on the basis of the specified parameter.

According to a fifth aspect of the present invention, in the image display device for direct drawing apparatus, preferably, the processing area is set with the pattern displayed on the display part.

By the fifth aspect of the present invention, the processing area to be subjected to the display RIP development is set with the pattern corresponding to the design data displayed on the display part. Accordingly, an operator can set the processing area while visually checking it. Therefore, it is possible to suppress wrong setting of the processing area.

According to a sixth aspect of the present invention, in the image display device for direct drawing apparatus, preferably, the display RIP development part performs RIP development of the portion corresponding to the processing area by using the specified parameter, to thereby obtain the specified image and also performs RIP development of the portion corresponding to the processing area by using a predetermined reference parameter, to thereby obtain a reference image, and a display part visibly displays the specified image and the reference image, overlapping each other, and displays a difference between the specified image and the reference image, being visually distinguished from a common portion between the specified image and the reference image.

By the sixth aspect of the present invention, the difference between the specified image obtained by the display RIP development on the basis of the specified parameter and the reference image obtained by the display RIP development on the basis of the reference parameter is displayed on the display part, being visually distinguished. Therefore, it is possible to check the difference between the specified image and the reference image without missing it.

According to a seventh aspect of the present invention, in the image display device for direct drawing apparatus, preferably, the display part displays the difference, being more visually emphasized than the common portion.

By the seventh aspect of the present invention, since the difference is displayed, being more visually emphasized than the common portion between the specified image and the reference image, it is possible to easily detect the difference.

According to an eighth aspect of the present invention, preferably, the image display device for direct drawing apparatus further comprises a mode setting part for setting one mode out of a plurality of modes on determination of the reference parameter and a reference parameter setting part for setting the reference parameter in accordance with the one mode which is set.

By the eighth aspect of the present invention, the reference parameter is set in accordance with one mode out of a plurality of modes on determination of the reference parameter. Therefore, it is possible to set the reference parameter in accordance with the purpose of comparison with the specified parameter.

According to a ninth aspect of the present invention, in the image display device for direct drawing apparatus, preferably, the specified image, the reference image, and the difference are compositely displayed in one screen area, being aligned with one another.

By the ninth aspect of the present invention, the specified image, the reference image, and the difference are compositely displayed in one screen area, being aligned with one another. Therefore, it is possible to easily recognize the position where the difference is formed.

According to a tenth aspect of the present invention, in the image display device for direct drawing apparatus, preferably, a display color of the difference on the display part is different from respective display colors of the specified image and the reference image.

By the tenth aspect of the present invention, the display color of the difference in the display part is different from respective display colors of the specified image and the reference image. Therefore, it is possible to easily detect the difference.

According to an eleventh aspect of the present invention, in the image display device for direct drawing apparatus, preferably, a display color of the difference having a positive value is different from that of the difference having a negative value.

By the eleventh aspect of the present invention, since the display color of the difference having a positive value is different from that of the difference having a negative value, it is possible to easily check if the difference is caused by that the specified image is larger than the reference image.

The present invention is also intended for a tangible and non-transitory computer readable recording medium for recording a program which can be read by a computer provided with a display screen. The present invention is further intended for a program which can be read by a computer provided with a display screen.

Therefore, it is an object of the present invention to provide a technique for easily checking image data to be used for drawing of a figure which is generated by RIP development on the basis of a RIP parameter, before the drawing, every time when the RIP parameter is set.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view showing a constitution of a figure drawing system incorporating an image display device for direct drawing apparatus in accordance with a first preferred embodiment of the present invention;

FIG. 4 is a schematic view showing a functional structure of the image processing apparatus in accordance with the first preferred embodiment;

FIG. 7 is a view showing image processing on the display part when the processing area is an entire area of the pattern;

FIG. 8 is a view showing specified images before and after update of a specified parameter on a predetermined item;

FIG. 10 is a view showing specified images before and after update of the specified parameter on a predetermined item;

FIG. 11 is a view showing specified images before and after update of the specified parameter on a predetermined item;

FIG. 13 is a schematic view showing a functional structure of the image processing apparatus in accordance with the second preferred embodiment;

FIG. 15 is a schematic view showing difference extraction images in various modes.

DESCRIPTION OF THE PREFERRED EMBODIMENTS

Figure 2:
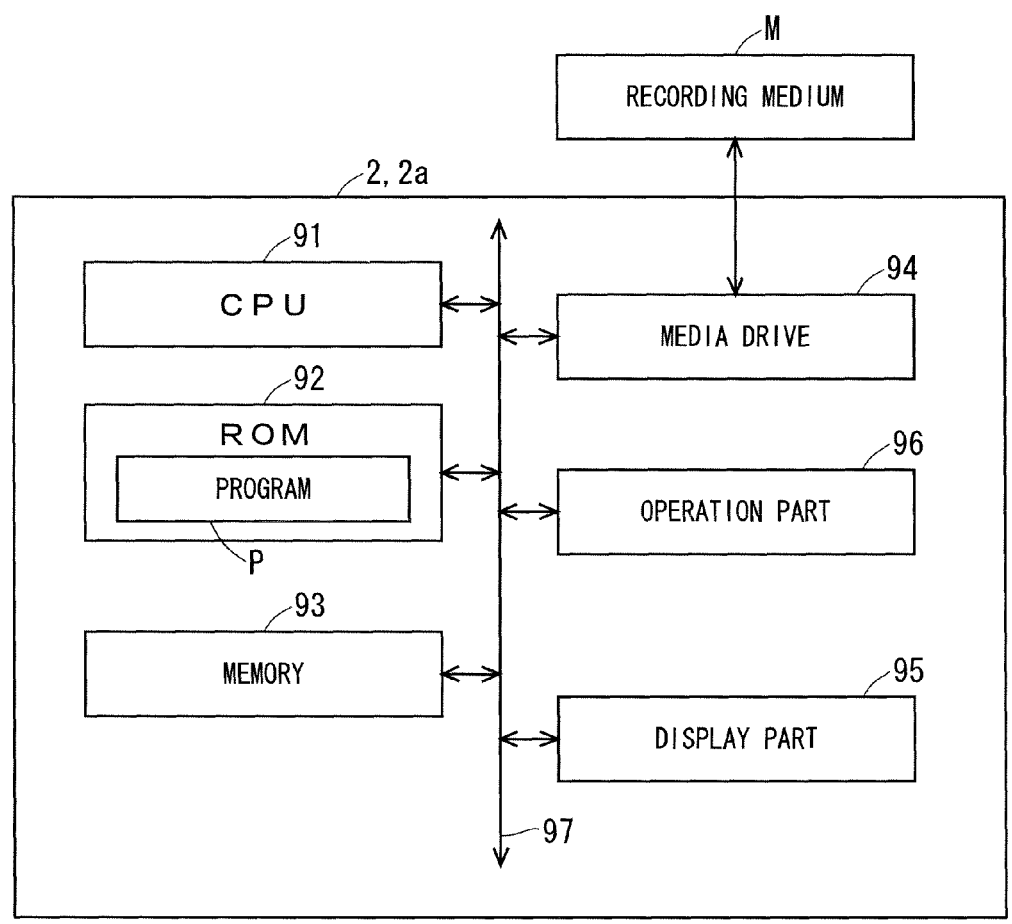
FIG. 2 is a block diagram showing a hardware structure of an image processing apparatus in accordance with the first preferred embodiment.

Hereinafter, with reference to figures, discussion will be made on the preferred embodiments of the present invention. The preferred embodiments discussed below are only exemplary embodiments of the present invention and do not restrict the scope of the invention.

The First Preferred Embodiment

Overall Structure

FIG. 1 is a view showing a constitution of a figure drawing system 100 incorporating an image display device for direct drawing apparatus in accordance with the first preferred embodiment of the present invention. The figure drawing system 100 is used as a system for directly drawing a figure corresponding to, for example, a circuit pattern on a resist layer by selectively exposing the resist layer on a semiconductor substrate.

The figure drawing system 100 comprises a design data generation apparatus 1, an image processing apparatus 2, and a drawing apparatus 3. These apparatuses 1, 2, and 3 are connected to one another via a network N such as a LAN or the like.

The design data generation apparatus 1 is an apparatus for generating and editing data describing a pattern area to be drawn on a drawing object. The data is generated, specifically, as figure data described in a vector format by using CAD. In the following discussion, this data is referred to as design data D0.

The design data D0 generated by the design data generation apparatus 1 can be received by both the image processing apparatus 2 and the drawing apparatus (direct drawing apparatus) 3. The image processing apparatus 2 and the drawing apparatus 3 each have a RIP development function, but the RIP development is performed for different purposes in the image processing apparatus 2 and the drawing apparatus 3.

Specifically, a data processing part 3a in the drawing apparatus 3 has a function of performing RIP development (hereinafter, referred to as "drawing RIP development") of the design data D0, to thereby generate raster data for drawing. A drawing control part 3b on/off modulates a laser beam on the basis of the raster data for drawing obtained by the drawing RIP development while selectively exposing the drawing object (substrate) by two-dimensionally scan. In the following discussion, the raster data (raster data for drawing) obtained by the drawing RIP development is referred to also as "drawing image data D1".

On the other hand, the image processing apparatus 2 has a function of acquiring the design data D0 from the design data generation apparatus 1 in a stage prior to the drawing RIP development and performing preliminary RIP development (hereinafter, referred to as "display RIP development") of the acquired design data D0, to thereby generate raster data for display, and another function of performing visible display on the basis of the raster data for display obtained by the display RIP development in real time. In other words, the image processing apparatus 2 has a preview function of previewing an image of the pattern area. The preview function includes both a reduced display for the entire pattern area and an enlarged display for a partial pattern area. The image processing apparatus 2 of the first preferred embodiment has a function as an "image display device for direct drawing apparatus" in the present invention. In the following discussion, the raster data (raster data for display) obtained by the display RIP development is referred to also as "display image data D2".

As discussed above, the drawing RIP development is RIP development for an entire drawing pattern with a resolution required for actual drawing while the display RIP development is RIP development performed for display on a display device. Therefore, the display RIP development is performed with a resolution lower than that for the drawing RIP development. To put it another way, the display RIP development is RIP development simpler than the drawing RIP development for the reason that only a partial pattern area, not an entire pattern area, is subjected thereto, or the like. Therefore, the time required for the display RIP development is shorter than that for the drawing RIP development. Further, the amount of data to be held for the display RIP development is smaller than that for the drawing RIP development.

Specifically, the image processing apparatus 2 performs the display RIP development of a specified portion of the design data D0 with the amount of processed data which is smaller than that of the drawing RIP development and displays the specified portion, to thereby speed up the data processing for preview display of the image and ensure real-time update of image display in response to update of a parameter.

The raster data (raster image data) obtained by the RIP development (the drawing RIP development or the display RIP development) is, as known well, data in which multiple data (line data) in each of which binary image data forming a pixel are arranged in a main scan direction are arranged in a subscan direction orthogonal to the main scan direction.

In the drawing RIP development, the design data D0 described in the vector format is converted into the raster data (raster data for drawing). The raster data is further subjected to run-length coding and run-length data (run-length data for drawing) which is thereby compressed is outputted to the drawing control part 3b incorporated in the drawing apparatus 3. The run-length data which is thus obtained is data in which the pattern area in the design data D0 is described by a chain of sequentially-arranged lengths of exposure sections by the scan line.

In the drawing apparatus 3, a scan drawing part 3c directly exposes a pattern area on a substrate (drawing object) on the basis of the drawing image data D1 obtained by the RIP development (drawing RIP development) of the design data D0 performed by the data processing part 3a. Specifically, the data processing part 3a acquires the design data D0 from the design data generation apparatus 1 and also acquires the specified parameter Pa1 to be used for the drawing RIP development from the image processing apparatus 2, and performs the RIP development (drawing RIP development) of the design data D0 in accordance with the specified parameter Pa1. The drawing image data D1 is thereby generated. On the other hand, the scan drawing part 3c performs drawing by scanning the pattern area with a light beam on the basis of the drawing image data D1. A two-dimensional image which corresponds to a figure pattern is thereby recorded on the drawing object. Specifically, the scan drawing part 3c modulates the light beam in accordance with the drawing image data D1 by using a spatial light modulator such as a digital micromirror device or the like and emits the modulated light beam onto a resist layer (generally, photosensitive layer) on the semiconductor substrate which is the drawing object, to thereby draw a wiring pattern on the substrate.

Though the case where the data processing part 3a in the drawing apparatus 3 performs the drawing RIP development is discussed in the first preferred embodiment, there may be a case where a dedicated RIP device provided between the image processing apparatus 2 and the drawing apparatus 3 performs the drawing RIP development and the generated drawing image data D1 is transmitted from the RIP device to the drawing apparatus 3. There may be another case where the image processing apparatus 2 performs the drawing RIP development of the design data D0 in accordance with the specified parameter Pa1 and the generated drawing image data D1 is transmitted from the image processing apparatus 2 to the drawing apparatus 3. In these cases, the data processing part 3a in the drawing apparatus 3 does not need any RIP development function.

Further, the image processing apparatus 2 does not have to be provided outside the drawing apparatus 3 but may be formed with the drawing apparatus 3 as one unit. Furthermore, the image processing apparatus 2 may be provided with CAD and then the design data D0 can be directly generated by using the CAD provided in the image processing apparatus 2.

<Image Processing Apparatus 2>
<Hardware Structure>

FIG. 2 is a block diagram showing a hardware structure of the image processing apparatus 2 which is a computer.

The image processing apparatus 2 consists of a CPU 91, a ROM 92, a memory 93, a media drive 94, a display part 95, an operation part 96, and the like. These hardware elements are electrically connected to one another with a bus line 97.

The CPU 91 controls these hardware elements on the basis of a program P stored in the ROM 92 (or read thereinto through the media drive 94), to thereby implement the functions of the image processing apparatus 2.

The ROM 92 is a read only memory in which the program P and data required to control the image processing apparatus 2 are stored in advance.

The memory 93 is a readable and writable memory and temporarily stores data generated during computation performed by the CPU 91, or the like. The memory 93 is an SRAM, a DRAM or the like.

The media drive 94 is a functional part for reading information from a recording medium (more specifically, a portable recording medium such as CD-ROM, DVD (Digital Versatile Disk), flexible disk, or the like) M which stores the information.

The operation part 96 is an input device such as a keyboard and a mouse and receives a user manipulation such as an input of commands and various data. The user manipulation received by the operation part 96 is inputted to the CPU 91 as a signal.

The display part 95 is provided with a display such as a color LCD, and the like and variably displays various data and operating states. On the display part 95, displayed is an operation GUI (Graphic User Interface) 80 as shown in FIG. 3.

Herein, with reference to FIG. 3, discussion will be made on the operation GUI 80. As shown in FIG. 3, for example, the operation GUI 80 comprises a processing area display screen 81 displaying part of the pattern area defined by the design data D0 on the basis of the image data (display image data) D2 after the display RIP development and a parameter setting screen 82 displaying input fields into which inputs for setting the specified parameter Pa1 are made. In the operation GUI 80, the processing area display screen 81 and the parameter setting screen 82 are displayed, being arranged in parallel.

The specified parameter Pa1 includes items such as layer No., size of pitch, sizing (enlargement and reduction) of line width, designation of Neg./Pos., specified area, and the like.

Figure 3:
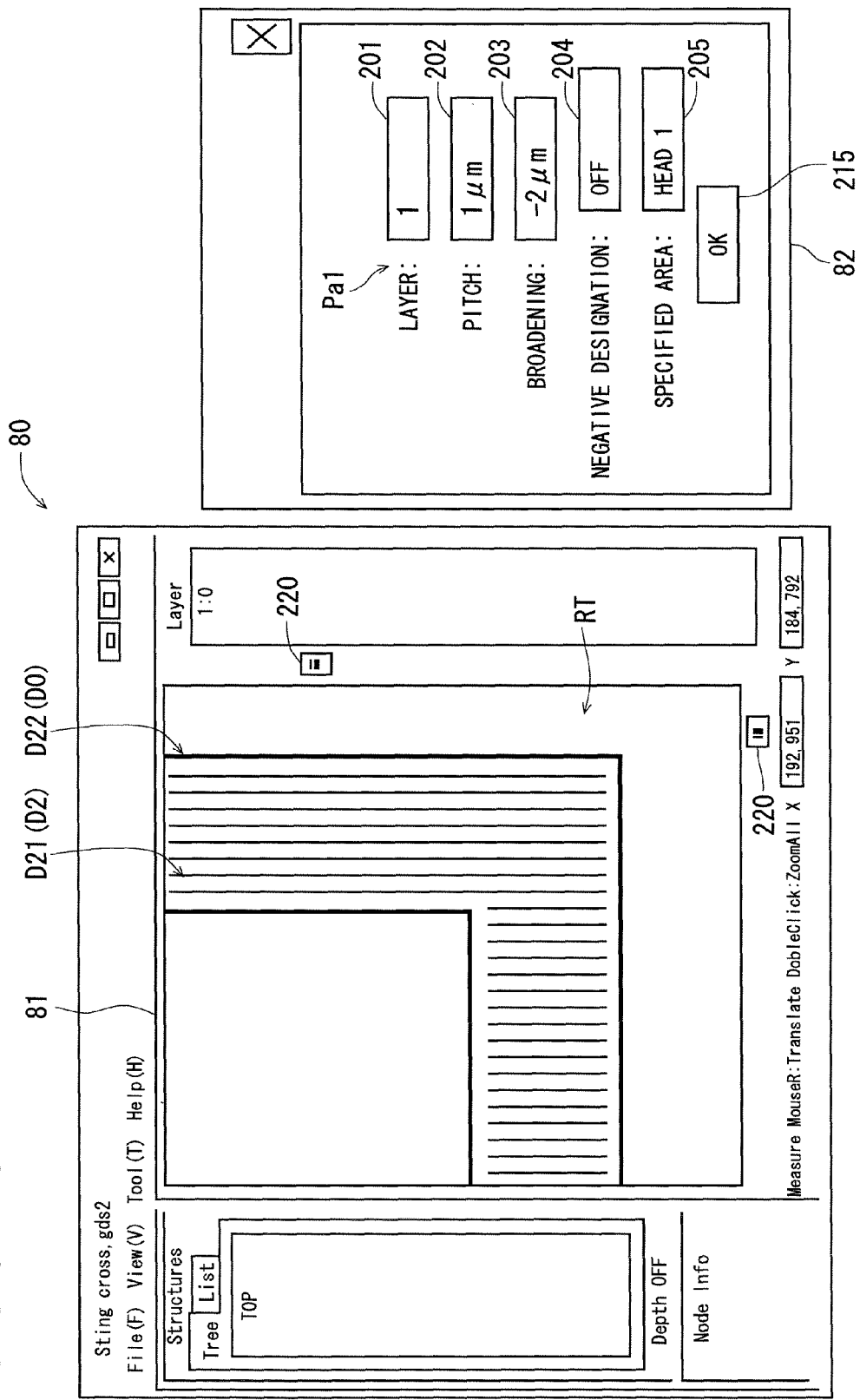
FIG. 3 is a schematic view showing an operation GUI of the image processing apparatus in accordance with the first preferred embodiment.

For example, in the "Layer" 201 in the parameter setting screen 82 shown in FIG. 3, a layer No. is set. The layer set in this field is displayed in the processing area display screen 81. In the "Pitch" 202, the size of one pixel is set. Each pixel in the image data (display image data) D2 after the RIP development is set to the size set in this field. In the "Broadening" 203, the amount of adjustment of the line width of a pattern represented by the display image data D2 is set. When a positive value is inputted to the field of the "Broadening" 203, the line width of the pattern becomes thicker by the set value from the line width before setting, and when a negative value is inputted to the field of the "Broadening" 203, the line width of the pattern becomes thinner by the set value from the line width before setting. In "Negative Designation" 204, whether a predetermined area should be displayed as a negative area or a positive area is set. Specifically, when "ON" is inputted to the field of the "Negative Designation" 204, the predetermined area is displayed as a negative area, and when "OFF" is inputted to the field of the "Negative Designation" 204, the predetermined area is displayed as a positive area. In the "Specified Area" 205, an exposure head of the scan drawing part 3c in the drawing apparatus 3 is set. A partial area to be drawn by the specified exposure head is designated out of the pattern area, and displayed in the processing area display screen 81. These are only examples of the specified parameter Pa1 and the specified parameter Pa1 is not limited to these. For example, an item for setting whether there is a halftone to be set or not for smooth representation of slanting lines, an item for setting conditions for the edge exposure, an item for setting whether there is tone reversal or not, an item for setting an angle of the rotation, an item for setting whether there is an mirror image or not, an item for setting the size of a substrate which is a drawing object and the initial set position thereof in the apparatus, and the like may be further provided.

The contents of the items specified as the specified parameters Pa1 are stored in the specified parameter storage part 23 described later as a set of specified parameters Pa1.

The display RIP development using the specified parameter Pa1 is performed when the contents of the items specified as the specified parameters Pa1 are inputted into the parameter setting screen 82 of the operation GUI 80 and then the "OK" key 215 on the operation GUI 80 is clicked. Further, there may be a case where the display RIP development is performed every time when the content(s) of at least one item specified as the specified parameter Pa1 is inputted into the operation GUI 80.

Only the pattern area corresponding to the design data D0 to be subjected to the RIP development is displayed in the processing area display screen 81 as an initial image until the specified parameter Pa1 is first set. After the specified parameter Pa1 is set and the RIP development (display RIP development) on the basis of the specified parameter Pa1 is performed, an image (hereinafter, referred to as a "specified image D21") obtained by the display RIP development and the pattern area (hereinafter, referred to as a "design image D22") represented by the design data D0, which is displayed as the initial image are displayed, overlapping each other, in the processing area display screen 81. The design image D22 is an image obtained by performing the RIP development of the design data D0 described in the vector format on the basis of an initial parameter which is set in advance. The initial parameter is a RIP parameter used to perform the RIP development of the design data D0 with fidelity without any adjustment such as sizing, tone reversal, or the like and set inside the apparatus in advance for initial display.

The display RIP development is performed in real time only on part of the design data D0 corresponding to a portion (hereinafter, referred to also as a "display object portion") of the pattern area, which the operator intends to display in the processing area display screen 81. Specifically, when the display object portion of the pattern area is set by the user manipulation, a two-dimensional coordinates range corresponding to the display object portion is specified. Only the design data D0 corresponding to the specified two-dimensional coordinates range is subjected to the RIP development in accordance with the specified parameter Pa1. The specified image D21 of the display object portion which is obtained by the RIP development is displayed in the processing area display screen 81 together with the design image D22 which corresponds to the portion.

The above-discussed setting of the display object portion is performed by moving the pattern area displayed in the processing area display screen 81 in an X direction and/or a Y direction with scroll bars 220 provided on one side and a lower portion of the processing area display screen 81, by adjusting the display magnification of the pattern area with a double click of the mouse, or the like. Further, the pattern area may be moved with a drag and drop of the mouse on the processing area display screen 81.

<Functional Structure>

FIG. 4 is a block diagram showing a functional structure of the image processing apparatus 2.

The image processing apparatus 2 comprises a design data acquisition part 20, a design data storage part 21, a specified parameter setting part 22, a specified parameter storage part 23, a processing area setting part 25, a display RIP development part 26, and a transmitting part 30. The respective functions of these elements are implemented by reading the program P stored in the ROM 92 in advance or the program P recorded in the recording medium M by the media drive 94 and executing the program in the CPU 91.

The design data acquisition part 20 acquires the design data D0 describing the pattern area to be drawn from the design data generation apparatus 1 via the network N. The design data D0 may be acquired via, for example, a portable storage medium, instead of the network N.

The design data storage part 21 stores the design data D0 acquired by the design data acquisition part 20. The stored design data D0 is read out as appropriate to be used for the display RIP development.

The specified parameter setting part 22 sets the RIP parameter (specified parameter Pa1) to be used for the RIP development of the design data D0. Specifically, when an operator inputs values to be set for the items specified as the specified parameter Pa1 into the parameter setting screen 82 through the operation part 96, the inputted contents (values) are set in the specified parameter setting part 22 as the specified parameters Pa1.

The specified parameter storage part 23 stores the specified parameter Pa1 set in the specified parameter setting part 22. The stored specified parameters Pa1 are read out as appropriate to be set as the RIP parameter to be used for the drawing RIP development, or the like.

The processing area setting part 25 sets a processing area RT out of the pattern area of the design data D0 or the display image data D2 which is displayed in the processing area display screen 81. Specifically, the user manipulation such as a scroll, a zoom-in, a zoom-out, or the like is performed through the operation part 96 on the pattern area displayed in the processing area display screen 81. Part of the pattern area or the entire pattern area which the operator intends to visually check is thereby displayed in the processing area display screen 81. The processing area setting part 25 sets a portion to be displayed in the processing area display screen 81 as the processing area RT. In other words, the processing area RT is part or the whole of the pattern area displayed in the processing area display screen 81, which corresponds to the above-described display object portion.

In general, the operator seldom checks equally all the portions of the entire pattern area and intends to particularly check a limited portion. The portion to be checked is mainly a portion having some specific geometric feature in which an error is likely to occur in a drawing step or a process. A partial area such as a curve, a portion with acute angle, a fine line, a vertex, or the like of the pattern area is set as the processing area RT (display object portion). In the specified image D21 after the display RIP development, it is thereby possible to check the result of quantization, how a half tone is made, or the like.

On the other words, in a case where an entire image of the pattern area (entire area) is set as the processing area RT, in the specified image D21 after the display RIP development, it is possible to check the arrangement of a plurality of chips, the edge treatment, or the like.

The display RIP development part 26 performs the RIP development (display RIP development) of the design data D0 corresponding to the processing area RT (display object portion) on the basis of the specified parameter Pa1 set by the specified parameter setting part 22. The portion of the design data D0, which corresponds to the processing area RT, is thereby converted into the image data (display image data) D2 corresponding to the specified parameter Pa1. The display RIP development is started at the timing of, for example, completing the input of the specified parameter Pa1 or with the click of the "OK" key 215 on the operation GUI 80 as a trigger and immediately performed.

<Operation Flow>

Figure 5:
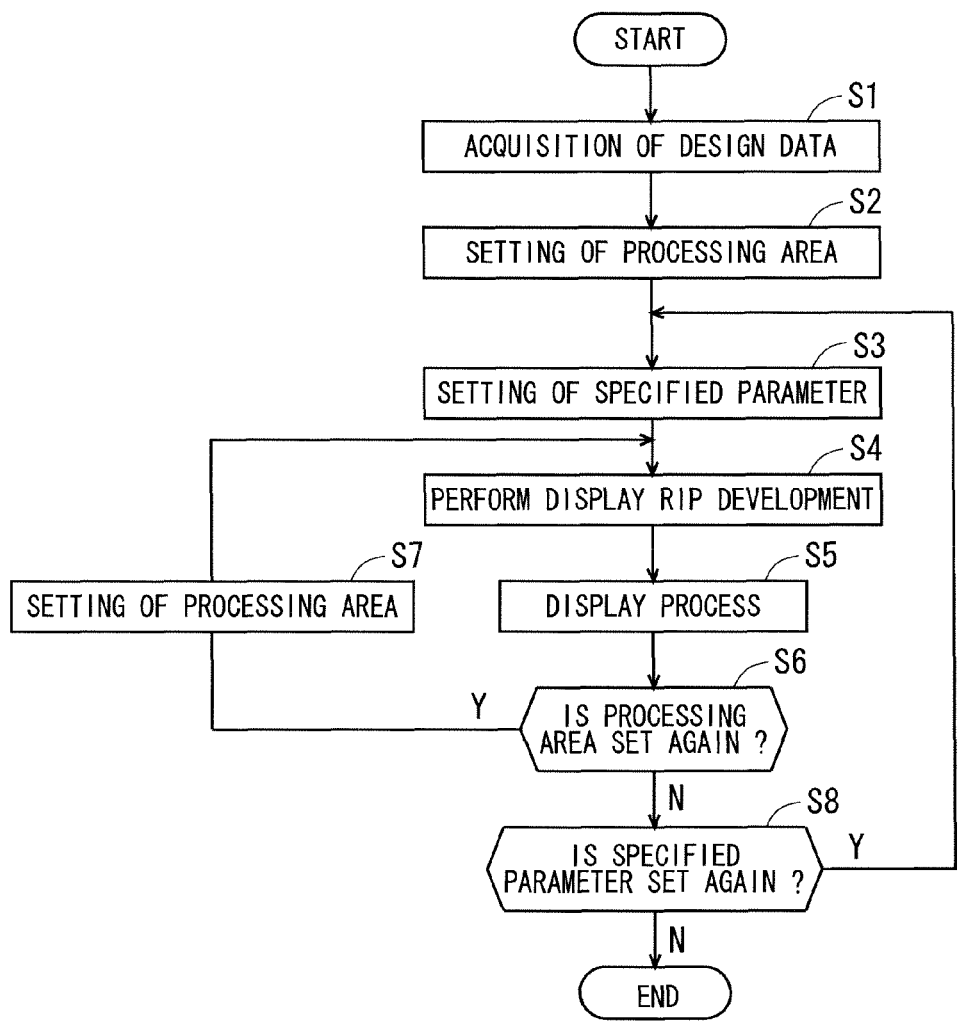
FIG. 5 is a flowchart showing an operation flow of the image processing apparatus in accordance with the first preferred embodiment.
Figure 6:
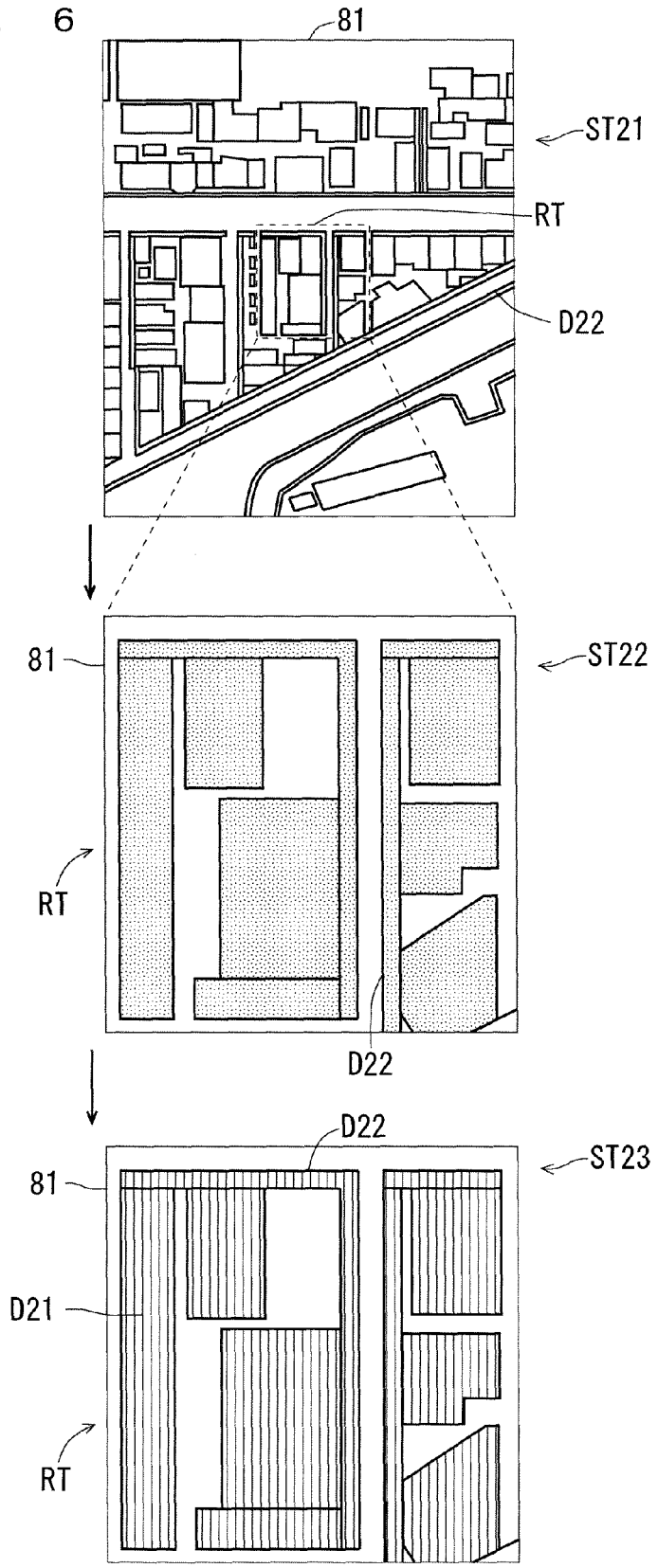
FIG. 6 is a view showing image processing on a display part when a processing area is a partial area of a pattern.

Now, with reference to the flowchart of FIG. 5, discussion will be made on an operation flow of the image processing apparatus 2. FIG. 6 shows how a partial area of the pattern of the design image D22 is set as the processing area RT and subjected to the display RIP development. FIG. 7 shows how an entire area of the pattern of the design image D22 is set as the processing area RT and subjected to the display RIP development.

First, the design data acquisition part 20 acquires the design data D0 generated by the design data generation apparatus 1, via the network N (Step S1). The acquired design data D0 is stored in the design data storage part 21.

An operator selects desired design data D0 out of various design data D0 stored in the design data storage part 21 through the operation GUI 80. Then, the design image D22 relating to the selected design data D0 is displayed in the processing area display screen 81 of the operation GUI 80. There may be a case where the design data D0 acquired by the design data acquisition part 20 is directly displayed as the design image D22 in the processing area display screen 81.

Subsequently, the processing area setting part 25 sets the processing area RT in accordance with the manipulation made by the operator through the operation part 96 (Step S2). Specifically, the operator makes manipulation while watching the design image D22 displayed in the processing area display screen 81, to thereby display an area to be checked in the processing area display screen 81. The processing area setting part 25 sets the area which is currently displayed, as the processing area RT.

In a case, for example, where the processing area RT is a partial area of the pattern area, as shown in FIG. 6, an area which the operator intends to check, out of the design image D22 (ST21), is enlarged (ST22) and displayed so that the line width or the shape can be minutely checked. A satin-finished area of the design image D22 shown in ST22 of FIG. 6 corresponds to a data area to be subjected to the display RIP development.

Further, in a case where the processing area RT is an entire area of the pattern area, as shown in FIG. 7, the design image D22 is reduced and the whole of the pattern area R is displayed in the processing area display screen 81 (ST31). A satin-finished area of the design image D22 shown in ST31 of FIG. 7 corresponds to a data area to be subjected to the display RIP development.

Subsequently, when the operator inputs the specified parameter Pa1 (specifically, inputs the contents of the items specified as the specified parameters Pa1) into the parameter setting screen 82 of the operation GUI 80, the specified parameter setting part 22 sets the inputted contents as the specified parameters Pa1 (Step S3). Herein, at the point in time when the input of the specified parameters Pa1 into the operation GUI 80 is completed, a set of the specified parameters Pa1 is stored in the specified parameter storage part 23.

When the specified parameter Pa1 is inputted and the "OK" key 215 on the operation GUI 80 is clicked by the operator, with this as a trigger, the display RIP development part 26 immediately performs the display RIP development (Step S4).

The display RIP development is performed with a resolution in accordance with the display magnification of the processing area RT in the processing area display screen 81. Specifically, for example, when the display magnification is relatively high, in other words, when the processing area RT is a partial area of the pattern area and the partial area is displayed, being enlarged, in the processing area display screen 81, the display RIP development is performed with relatively high resolution. When the display RIP development is completed, as shown in FIG. 6, the specified image D21 is displayed together with the design image D22 (ST23).

Further, for example, when the display magnification is relatively low, in other words, when the processing area RT is an entire area of the pattern area and the entire area is displayed, being reduced, in the processing area display screen 81, the display RIP development is performed with relatively low resolution. Specifically, the size of each pixel in the processing area display screen 81 corresponds to a pixel pitch of the image obtained by the display RIP development. When a substrate of 300 mm is displayed with 1000 pixels, the pixel pitch corresponds to 300 μm which is the size of each pixel. Therefore, a very small figure having a size not larger than 300 nm in the processing area RT is displayed, being solid filled, after the display RIP development. In other words, the RIP development is performed coarsely. Therefore, the resolution of the display RIP development in the case where the processing area RT is the entire area of the pattern area R is lower than that in the case where the processing area RT is the partial area of the pattern area R. When the display RIP development is completed, as shown in FIG. 7, the specified image D21 is displayed together with the design image D22 (ST32).

Thus, since the display RIP development is performed restrictively on part of the design data D0 in the case where the processing area RT corresponds to the partial area of the pattern area R and the display RIP development is performed coarsely in the case where the processing area RT corresponds to the entire area of the pattern area R, the display RIP development is RIP development in which the amount of processed data is smaller than that in drawing RIP development.

After the display RIP development on the basis of the specified parameter Pa1 is performed with the resolution in accordance with the display magnification of the processing area, the generate specified image D21 is displayed together with the design image D22 in the processing area display screen 81 (Step S5).

When the specified image D21 is displayed, the operator checks the specified image D21 displayed in the processing area display screen 81. When the operator sets the processing area RT again, the processing area setting part 25 determines to perform the display RIP development again ("YES" in Step S6) and newly sets the processing area RT (Step S7). Then, the display RIP development and the display of the specified image D21 are performed again.

Further, when the specified image D21 is displayed, it is determined whether or not the specified parameter Pa1 should be set again and the display RIP development should be performed again (Step S8). Specifically, when the operator changes the content(s) of at least one item specified as the specified parameter Pa1, the specified parameter setting part 22 determines that the specified parameter Pa1 should be set again ("YES" in Step S8) and sets the specified parameter Pa1 again in accordance with the input (Step S3). For example, when the operator judges that the shape of the specified image 21 has a problem in its quality for the drawing to be performed by the drawing apparatus 3 and inputs the change of the specified parameter Pa1, the specified parameter Pa1 is updated, and the display RIP development and the display of the specified image D21 are performed again.

Step S6 and Step S8 may be executed in the reverse order.

The operator updates the specified parameter Pa1 or the processing area RT in various ways and visually checks these display images while updating the display image. Then, when an optimum display image can be obtained, the operator inputs an instruction that the value of the specified parameter Pa1 giving the display image should be determined as the RIP parameter to be used for the drawing RIP development. When the instruction input is received, the specified parameter storage part 23 reads the specified parameter Pa1 which is determined and transmits the specified parameter Pa1 to the transmitting part 30 as a RIP parameter to be used for the drawing RIP development. The transmitting part 30 transmits the acquired RIP parameter to the drawing apparatus 3.

Thus, the display RIP development and the display of the specified image D21 are performed in real time every time when the specified parameter Pa1 is updated or the processing area RT is updated.

Figure 9:
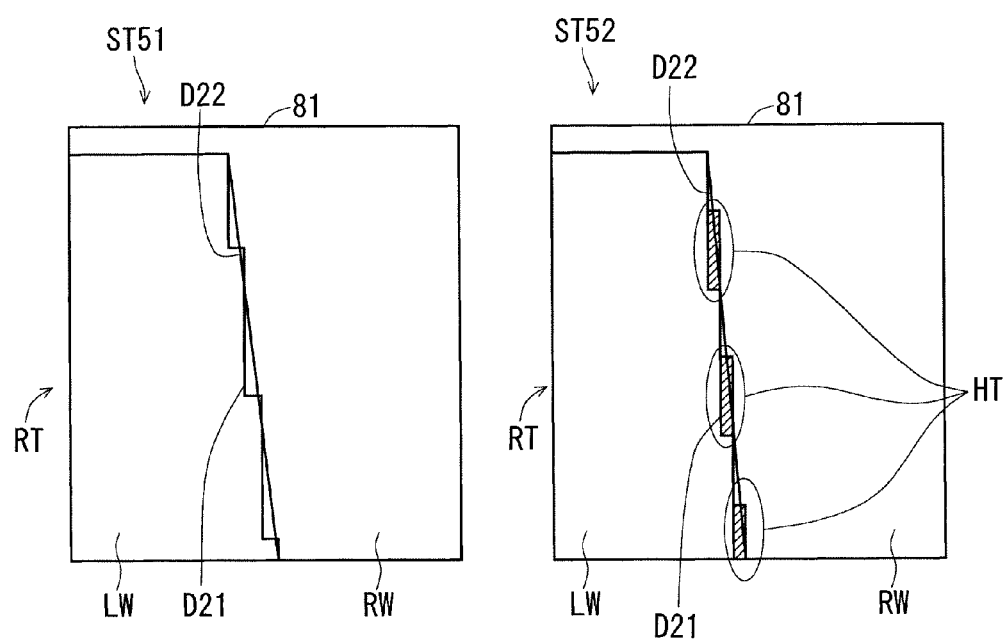
FIG. 9 is a view showing specified images before and after update of the specified parameter on a predetermined item.

Herein, with reference to FIGS. 8 to 11, discussion will be made on the specified images D21 before and after the update of the specified parameter Pa1 by the item of the specified parameter Pa1. FIGS. 8 to 10 each show the case where the processing area RT corresponds to the partial area of the pattern area R. FIG. 11 shows the case where the processing area RT corresponds to the entire area of the pattern area R.

FIG. 8 shows a specified image D21 (ST41) in a case where the negative designation is "ON" in the parameter setting screen 82 and a specified image D21 (ST42) in a case where the negative designation is "OFF". Thus, between the specified image D21 (ST41) in the case where the negative designation is "ON" and the specified image D21 (ST42) in the case where the negative designation is "Off", the pattern area of the specified image D21 obtained by the display RIP development and a white area HW representing the background are switched each other. In other words, in accordance with whether the negative designation is "ON" or "OFF", the Neg./Pos. of the specified image D21 is reversed.

FIG. 9 shows a specified image D21 (ST51) in a case where there is no half tone HT for smooth representation of slanting lines and a specified image D21 (ST52) in a case where there is a halftone HT. In each of the images ST51 and ST52 shown in FIG. 7, a white area LW represents the pattern area and a white area RW represents a background. When the pattern of the design image D22 represented by the slanting lines is subjected to the RIP development, the specified image D21 corresponding to this portion is displayed in a step-like manner (ST51). When the portion of the specified image D21 which is represented in a step-like manner is displayed with half tone, this portion of the specified image D21 can be displayed visually smoothly (ST52).

FIG. 10 shows a specified image D21 (ST61) in a case where the broadening width is set and a specified image D21 (ST62) in a case where the slimming width is set. An end portion of the pattern represented by the specified image D21 of ST61 is formed outside by the set value as the broadening width as compared with the pattern of the design image D22. Further, an end portion of the pattern represented by the specified image D21 of ST62 is formed inside by the set value as the slimming width as compared with the pattern of the design image D22. Thus, since the specified image D21 is displayed together with the design image D22, it is possible to adjust the line width of the pattern of the specified image D21 with the design image D22 as a guide.

FIG. 11 shows a specified image D21 (ST71) in a case where no edge exposure is formed and a specified image D21 (ST72) in a case where edge exposure is formed. The edge exposure refers to an exposure area which is so formed as to surround the outside of a chip formed on the substrate in a circle. Thus, by setting "ON" of the edge exposure as the specified parameter Pa1, the specified image D21 provided with an edge exposure area ER can be found (ST72). In both the specified images D21 in ST71 and ST72, the specified area is set as the specified parameter Pa1. Specifically, an exposure head serving to draw a left-half area of the whole of the pattern area R is set as the specified area. Therefore, only the left-half area of the whole of the pattern area R is displayed in the processing area display screen 81.

Thus, in response to the update of the specified parameter Pa1 or the update of the processing area RT, the display RIP development is performed again and the display in the processing area display screen 81 is updated in real time. It is therefore possible to adjust the specified parameter Pa1 and the like while monitoring the change of the image substantially in a dynamic manner. The real time in this case, however, includes not only the operation in response to the update of the specified parameter Pa1 or the update of the processing area RT but also the display RIP development and the update of the display which are performed when the operator gives an update command after the update of the specified parameter Pa1 or the update of the processing area RT. In other words, since it is possible to perform the update of the parameters and the check of the result without requiring the time for the drawing RIP development, the apparatus of the first preferred embodiment can perform a real-time processing.

Thus, in the image processing apparatus 2 of the first preferred embodiment, the display RIP development in which the amount of processed data is smaller than that in drawing RIP development is performed and the specified image D21 is thereby displayed. Accordingly, the RIP development can be performed immediately every time when the specified parameter Pa1 is set. Therefore, it is possible to easily check the image data to be used for drawing of a figure generated by the RIP development on the basis of the specified parameter Pa1 before the drawing RIP development every time when the specified parameter Pa1 is set.

Since the display RIP development is performed and the display is updated in response to the update of the specified parameter Pa1, it is possible to more immediately check the specified image D21 after the RIP development.

In case where the processing area RT corresponds to the partial area of the pattern area R, the display RIP development is performed with relatively high resolution, and in the case where the processing area RT corresponds to the entire area of the pattern area R, the display RIP development is performed with relatively low resolution. Therefore, it is possible to rapidly perform the display RIP development.

The specified image D21 obtained by the display RIP development is displayed, being aligned with the design image D22, in the processing area display screen 81. Therefore, it is possible to easily compare the pattern (specified image D21) represented by the display image data D2 obtained by the display RIP development on the basis of the specified parameter Pa1 with the pattern (design image D22) represented by the design data D0. In other words, it is possible to compare the specified image D21 with the design image D22 every time when the specified image D21 is updated in response to the update of the specified parameter Pa1 with the design image D22 as a guide.

Further, the processing area RT (display object portion) to be subjected to the display RIP development can be set while the design image D22 or the specified image D21 is displayed in the processing area display screen 81. Accordingly, the operator can set the processing area RT while visually checking the area. Therefore, it is possible to suppress wrong setting of the processing area RT.

The Second Preferred Embodiment

Background

Relating to the technique for checking the raster data itself to determine whether the RIP development is performed properly or not in direct drawing mode, for example, Japanese Patent Application Laid Open Gazette No. 2008-242885 discloses a technique in which design data described in the vector format is converted into raster data for drawing and the raster data is converted again into data described in the vector format, to thereby compare the design data with the data converted into the vector format.

Further, Japanese Patent Application Laid Open Gazette No. 2009-111148 discloses a technique in which design data described in the vector format is compared with drawing data into which the design data is converted, to thereby obtain a difference figure, and error factors other than defects due to the data conversion are removed by removing the difference figure, to thereby check raster data.

Furthermore, U.S. Pat. No. 4,450,769 discloses a technique in which values of drawing conditions to be used for drawing wiring patterns on a substrate are compared with respective threshold values to be used for determination of defects, to thereby determine whether there is a defect or not.

Such RIP development is performed on the basis of a predetermined RIP parameter which is set in advance. An operator, however, sometimes needs to change the RIP parameter immediately before the drawing operation because of, for example, conditions for a process, such as conditions of an etching solution, constraints due to specs (specifications) of a direct drawing apparatus, change of the principle of the drawing, or the like. In such a case, since there is a possibility of making an error in setting a changed RIP parameter, or the like, it is necessary for the operator to check how a pattern represented by image data which is obtained by RIP development is changed before and after the change of the RIP parameter.

In the techniques disclosed in Japanese Patent Application Laid Open Gazette Nos. 2008-242885 and 2009-111148 and U.S. Pat. No. 4,450,769, it is likely to miss the changed portion of the pattern represented by the image data due to the change of the parameter. Further, since it is necessary to perform the RIP development of the whole of the design data for the check, there arises a problem of increasing time loss.

Such a problem may occur not only in the case where the RIP parameter is changed before the drawing operation but also in a general case where a difference between two pieces of image data after the RIP development on the basis of two different RIP parameters.

The second preferred embodiment discussed below is intended to achieve a technique for immediately checking a difference between two pieces of image data to be used for drawing a figure, which are generated by the RIP development on the basis of two different RIP parameters, respectively.

<Overall Structure>

Now, discussion will be made on a figure drawing system 100a incorporating an image display device for direct drawing apparatus in accordance with the second preferred embodiment of the present invention. The following discussion will center on differences between the first and second preferred embodiments. Further, constituent elements identical to those in the first preferred embodiment are represented by the same reference signs.

The figure drawing system 100a of the second preferred embodiment, like the figure drawing system 100 of the first preferred embodiment, comprises the design data generation apparatus 1, an image processing apparatus 2a, the drawing apparatus 3. The respective constituent elements of the design data generation apparatus 1 and the drawing apparatus 3 are identical to those in the first preferred embodiment (see FIG. 1).

<Image Processing Apparatus 2a>

In the image processing apparatus 2a of the second preferred embodiment, design data D0 is subjected to the display RIP development on the basis of a RIP parameter (specified parameter Pa1) set for the drawing RIP development and a reference RIP parameter (hereinafter, referred to as a "reference parameter Pa2") to be compared with the specified parameter Pa1, respectively, to thereby generate two pieces of image data. Then, performed is extraction of a difference between the two pieces of display image data D2 which are thus generated. Hereinafter, detailed discussion will be made on the image processing apparatus 2a of the second preferred embodiment.

A hardware structure of the image processing apparatus 2a is identical to that of the image processing apparatus 2 of the first preferred embodiment and discussion thereof will be omitted (see FIG. 2).

Figure 12:
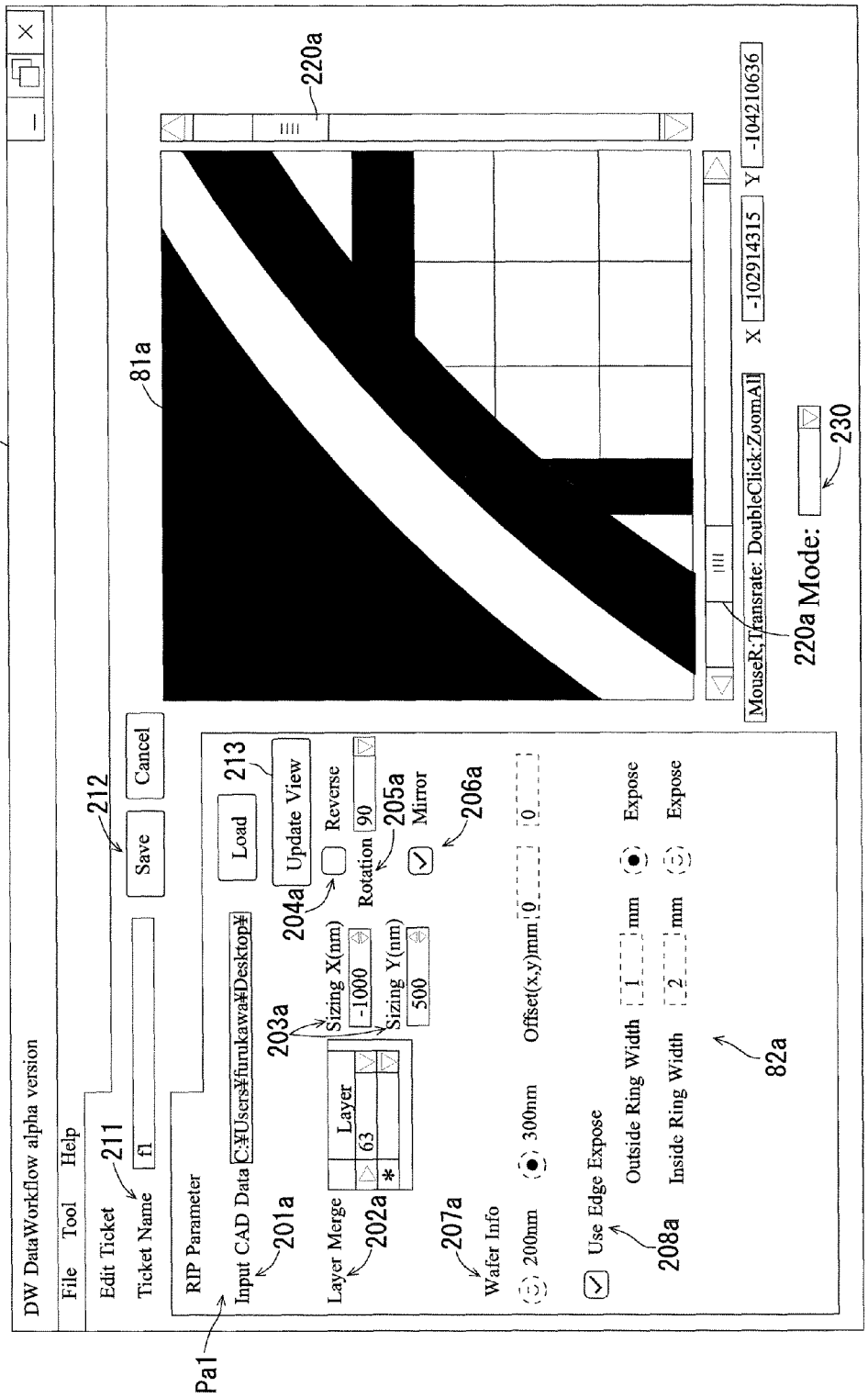
FIG. 12 is a schematic view showing an operation GUI of an image processing apparatus in accordance with a second preferred embodiment of the present invention.

On the display part 95 of the image processing apparatus 2a, displayed is an operation GUI (Graphic User Interface) 80a as shown in FIG. 12. Herein, with reference to FIG. 12, discussion will be made on the operation GUI 80a. As shown in FIG. 12, for example, the operation GUI 80a comprises a processing area display screen 81a displaying part of the pattern area defined by the design data D0 on the basis of the image data (display image data) D2 after the display RIP development and a parameter setting screen 82a displaying input fields into which inputs for setting the specified parameter Pa1 are made. In the operation GUI 80a, the processing area display screen 81a and the parameter setting screen 82a are displayed, being arranged in parallel.

The specified parameter Pa1 includes the items shown in the first preferred embodiment. The reference parameter Pa2 described later has the same items as the specified parameter Pa1. Parameter values set as the reference parameters Pa2 are set in accordance with one mode which is selected out of a plurality of modes, and this will be discussed later in detail.

In an exemplary case of FIG. 12, as the specified parameter Pa1, there are items such as file name of the design data D0, layer No., sizing (enlargement and reduction) of line width, ON/OFF of tone reversal, angle of rotation, ON/OFF of mirror image, edge exposure condition.

Specifically, in the "Input CAD Data" 201a in the parameter setting screen 82a shown in FIG. 12, the name of a CAD file is inputted. The CAD file which is inputted herein is captured as the design data D0, and an initial image which is obtained by the RIP development of the design data D0 on the basis of a predetermined initial parameter is displayed in the processing area display screen 81a. The initial parameter is a RIP parameter used to perform the RIP development of the design data D0 with fidelity without any adjustment such as sizing, tone reversal, or the like and set inside the apparatus in advance for initial display.

Further, in the "Layer Merge" 202a, the layer No. is set. In the "Sizing" 203a, the broadening width and the slimming width of a line width in the X and Y directions are inputted. In a case of set values shown in FIG. 12, for example, a line width which is slimmed by 1000 nm in the X direction and broadened by 500 nm in the Y direction from a default line width is set. In the "Reverse" 204a, whether the tone of the pattern area of the display image data D2 should be reversed or not is selected. In the "Rotation" 205a, a rotation angle of the pattern area of the display image data D2 is set. As the rotation angle, an arbitrary value may be inputted or one of values which are set in advance may be selected. In a case of not rotating the pattern area of the display image data D2, a value of "0" is set.

In the "Mirror" 206a, whether a mirror image should be used or not is set. In the "Wafer Info" 207a, the size of a substrate which is a drawing object and an initial set position thereof in the apparatus are set. In the "Use Edge Expose" 208a, an edge exposure condition is inputted. The edge exposure condition refers to a condition for setting an exposure area which is so formed as to surround the outside of a chip formed on the substrate in a circle. Specifically, whether the edge exposure should be performed or not is set, and if the edge exposure should be performed, a position (outside position or inside position) on the substrate on which an exposure area is to be formed and an exposure width are set. These are only examples of the specified parameter Pa1 and the specified parameter Pa1 is not limited to these.

The contents of the items specified as the specified parameters Pa1 are stored in a specified parameter storage part 23a described later as a set of specified parameters Pa1 when a storage name is inputted to the "Ticket Name" 211 and the "Save" key 212 is clicked.

The display RIP development using the specified parameter Pa1 is performed when the contents of the items specified as the specified parameters Pa1 are inputted into the parameter setting screen 82a of the operation GUI 80a and then the "Update View" key 213 in the operation GUI 80a is clicked. Further, there may be a case where the display RIP development is performed every time when the content of each item specified as the specified parameter Pa1 is inputted into the operation GUI 80a.

Only the design image D22 which is obtained by performing the RIP development of the design data D0 on the basis of the initial parameter which is set in advance with relatively low resolution is displayed in the processing area display screen 81a as an initial image until the specified parameter Pa1 is first set. After the specified parameter Pa1 is set and the RIP development (display RIP development) on the basis of the specified parameter Pa1 is performed, the display of the initial image is changed to the display of a comparison image. In the display of the comparison image, the image (specified image D21) obtained by the display RIP development on the basis of the specified parameter Pa1 and an image (hereinafter, referred to as a "reference image D23") obtained by the display RIP development on the basis of the reference parameter Pa2 are displayed, overlapping each other, in the processing area display screen 81a, and a portion of a difference S is highlighted. Further, as discussed above, the initial parameter is a RIP parameter used to perform the RIP development of the design data D0 with fidelity without any adjustment such as sizing, tone reversal, or the like and set inside the apparatus in advance for initial display.

As discussed above, the display RIP development is performed in real time only on a portion (display object portion) of the pattern area, which the operator intends to display in the processing area display screen 81a. Specifically, when the display object portion of the pattern area is set by user manipulation, a two-dimensional coordinates range corresponding to the display object portion is specified. Only the design data D0 of the portion corresponding to the specified two-dimensional coordinates range is subjected to the RIP development in accordance with the specified parameter Pa1. The specified image D21 of the display object portion based on the display image data D2 which is obtained by the RIP development is displayed in the processing area display screen 81a together with the reference image D23 which corresponds to the portion. In the processing area display screen 81a, however, the difference S between the specified image D21 and the reference image D23 is displayed, being highlighted.

The above-discussed setting of the display object portion is performed by moving the pattern area displayed in the processing area display screen 81a in an X direction and/or a Y direction with scroll bars 220a provided on one side and a lower portion of the processing area display screen 81a, by adjusting the display magnification of the pattern area with a double click of the mouse, or the like. Further, the pattern area may be moved with a drag and drop of the mouse on the processing area display screen 81a.

In a lower portion of the processing area display screen 81a of the operation GUI 80a, provided is a mode setting field 230. By one of a plurality of modes is selected in the mode setting field 230, a mode setting part 31 described later sets a mode relating to the determination of the reference parameter Pa2. Then, in accordance with the one mode which is set, the reference parameter setting part 24 sets the reference parameter Pa2. This will be discussed later in detail.

The RIP parameter is not limited to a value which is set on the operation GUI 80a. A minimum run-length, for example, depends on the specs (specifications) of the drawing apparatus 3. The minimum run-length represents a minimum pixel value which is drawable by the drawing apparatus 3. In other words, since a pixel having a value smaller than the minimum run-length cannot be drawn in terms of the specs of the apparatus, drawing is performed by filling a clearance between the pixels having a value smaller than the minimum run-length.

<Functional Structure>

FIG. 13 is a block diagram showing a functional structure of the image processing apparatus 2a.

The image processing apparatus 2a, like the image processing apparatus 2 in the first preferred embodiment, comprises a design data acquisition part 20a, a design data storage part 21a, a specified parameter setting part 22a, a specified parameter storage part 23a, a processing area setting part 25a, a display RIP development part 26a, and a transmitting part 30a. The image processing apparatus 2a further comprises a reference parameter setting part 24, a difference extraction part 27, a difference emphasis display part 28, and the mode setting part 31. The respective functions of these elements are implemented by reading the program P stored in the ROM 92 in advance or the program P recorded in the recording medium M by the media drive 94 and executing the program in the CPU 91.

The design data acquisition part 20a acquires the design data D0 describing the pattern area to be drawn from the design data generation apparatus 1 via the network N. The design data D0 may be acquired via, for example, a portable storage medium, instead of the network N.

The design data storage part 21a stores the design data D0 acquired by the design data acquisition part 20a. The stored design data D0 is read out as appropriate to be used for the display RIP development.

The specified parameter setting part 22a sets the RIP parameter (specified parameter Pa1) to be used for the RIP development of the design data D0. Specifically, when the operator inputs values of the specified parameter Pa1 into the parameter setting screen 82s through the operation part 96, the specified parameter Pa1 is set in the specified parameter setting part 22a.

The specified parameter storage part 23a stores the specified parameter Pa1 set in the specified parameter setting part 22a. The stored specified parameters Pa1 are read out as appropriate to be set as the reference parameter Pa2, to be set as the RIP parameter to be used for the drawing RIP development, or the like.

The processing area setting part 25a sets a processing area RT out of the pattern area of the display image data D2 in the display of the initial image or the display of the comparison image. Specifically, the user manipulation such as a scroll, a zoom-in, a zoom-out, or the like is performed through the operation part 96 on the pattern area displayed in the processing area display screen 81a. Part of the pattern area or the entire pattern area which the operator intends to visually check is thereby displayed in the processing area display screen 81a. The processing area setting part 25a sets a portion to be displayed in the processing area display screen 81a as a processing area RT. In other words, the processing area RT is part or the whole of the pattern area displayed in the processing area display screen 81a, which corresponds to the above-described display object portion.

The mode setting part 31 sets a mode for comparing the specified parameter Pa1 with the reference parameter Pa2. As a mode, for example, a limiting apparatus emphasis mode, a previous condition comparison mode, a parameter adjustment mode, a default comparison mode, and the like may be used. The operator can selects one of a plurality of modes by performing a selecting operation in the mode setting field 230 provided on the operation GUI 80a. The mode which is thus selected is set in the mode setting part 31.

The reference parameter setting part 24 sets the reference parameter Pa2 in accordance with the mode set by the mode setting part 31. Specifically, in the limiting apparatus emphasis mode, the specified parameter Pa1 in a case where the minimum run-length is zero is set as the reference parameter Pa2. In other words, the specified parameter Pa1 in a case where there is no limit imposed by the apparatus condition of the drawing apparatus 3 is set as the reference parameter Pa2.

In the previous condition comparison mode, a set of the specified parameters Pa1 which is used in the previous drawing RIP development is set as the reference parameter Pa2. In this case, when the mode is set, the specified parameter Pa1 satisfying this condition is read out from the specified parameter storage part 23a and set as the reference parameter Pa2.

In the parameter adjustment mode, a set of the specified parameters Pa1 which is used in the previous display RIP development is set as the reference parameter Pa2. Also in this case, when the mode is set, the specified parameter Pa1 satisfying this condition is read out from the specified parameter storage part 23a and set as the reference parameter Pa2.

In the default comparison mode, a set of the RIP parameters which is set in the specified parameter storage part 23a in advance as a default reference parameter is set as the reference parameter Pa2. This default reference parameter is, for example, a RIP parameter which is inputted by the operator in advance. Also in this case, when the mode is set, the default reference parameter is read out from the specified parameter storage part 23a and set as the reference parameter Pa2.

The display RIP development part 26a performs the RIP development (display RIP development) of the design data D0 corresponding to the processing area RT (display object portion) on the basis of the specified parameter Pa1 set by the specified parameter setting part 22a and the reference parameter Pa2 set by the reference parameter setting part 24a, respectively. The portion of the design data D0, which corresponds to the processing area RT, is thereby converted into two sets of display image data D2 for display corresponding to the specified parameter Pa1 and the reference parameter Pa2, respectively. The display RIP development is started at the timing of, for example, completing the input of the specified parameter Pa1 or with the click of the "Update View" key 213 on the operation GUI 80a as a trigger and immediately performed.

The difference extraction part 27 extracts the difference S between the specified image D21 obtained by the RIP development using the specified parameter Pa1 and the reference image D23 obtained by the RIP development using the reference parameter Pa2 by the pixel of the two images. For example, the difference S can be extracted by subtracting each pixel of the reference image D23 from the corresponding pixel of the specified image D21. In this case, in a portion of the difference S having a positive value, a drawing (exposure) range increases. In another portion of the difference S having a negative value, the drawing (exposure) range decreases. The difference extraction may be performed by subtracting each pixel of the specified image D21 from the corresponding pixel of the reference image D23.

The difference emphasis display part 28 displays the difference S extracted by the difference extraction part 27 in the processing area display screen 81a, being visually emphasized (highlighted). At that time, in the processing area display screen 81a, the specified image D21 and reference image D23 are displayed, overlapping each other. The difference S is displayed as an unshared portion between the specified image D21 and the reference image D23, in other words, a portion where the specified image D21 and the reference image D23 do not overlap each other.

This difference S is displayed in a color (display color) which is different from the color of a common portion between the specified image D21 and the reference image D23 which overlap each other. Further, for example, different display colors are used for the portion of the difference S having a positive value and the portion of the difference S having a negative value, respectively. Particularly, it is preferable that these colors should be complementary colors.

The visual emphasis is not limited to the different display color, but, for example, the difference S may be displayed with a different pattern (for example, differently hatched), or the difference S may have a different tone value, only if the presence of the difference is displayed in a visually emphasized manner.

The transmitting part 30a transmits the set of specified parameters Pa1 to be used for the drawing RIP development to the drawing apparatus 3.

<Operation Flow>

Figure 14:
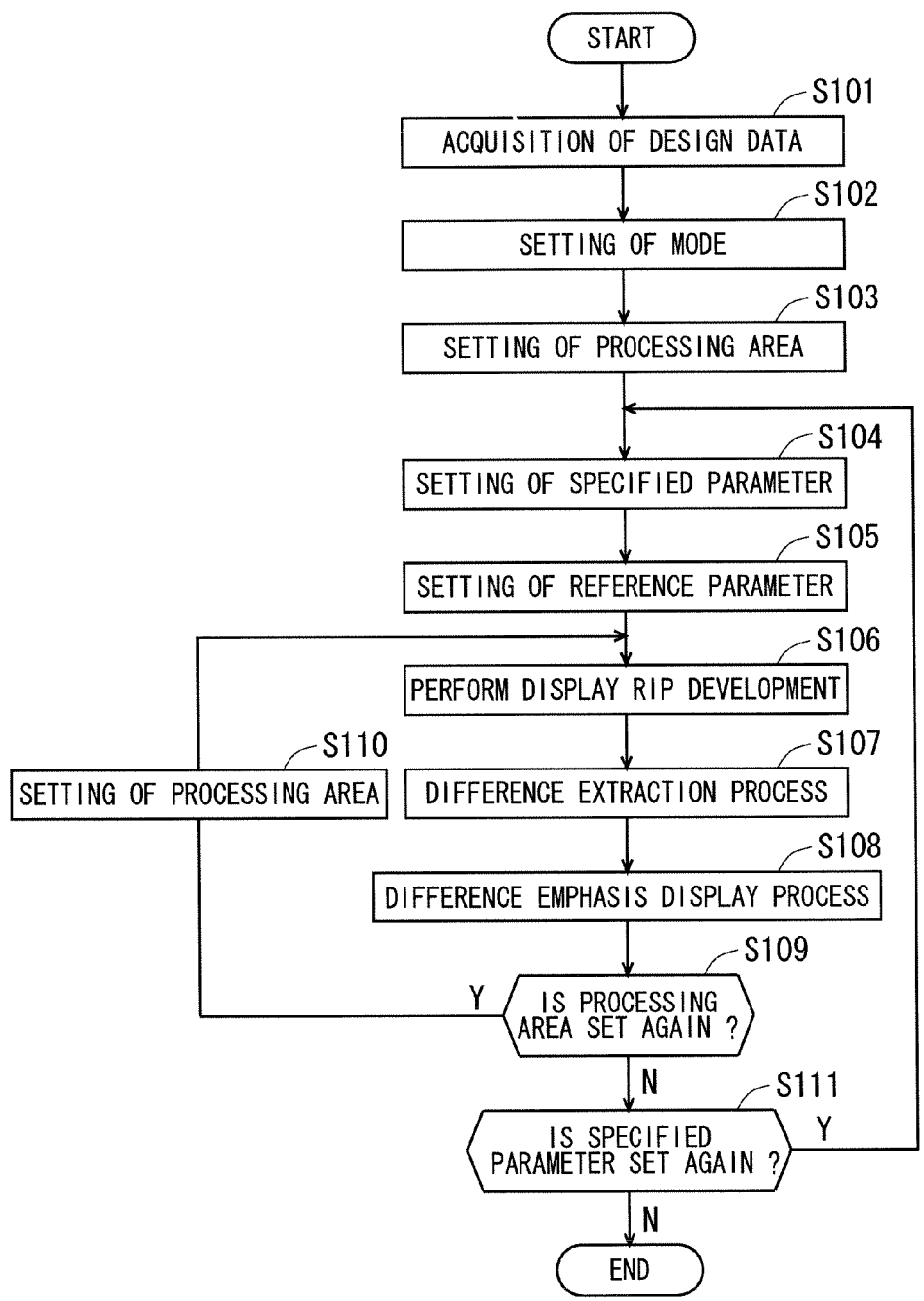
FIG. 14 is a flowchart showing an operation flow of the image processing apparatus in accordance with the second preferred embodiment.

Now, with reference to the flowchart of FIG. 14, discussion will be made on an operation flow.

First, the design data acquisition part 20a acquires the design data D0 generated by the design data generation apparatus 1, via the network N (Step S101). The acquired design data D0 is stored in the design data storage part 21a.

An operator selects desired design data D0 out of various design data D0 stored in the design data storage part 21a through the operation GUI 80a. The selected design data D0 is subjected to the display RIP development by using the initial parameter, to thereby generate the design image D22 with fidelity to the design data D0. Then, the design image D22 is displayed in the processing area display screen 81a of the operation GUI 80a as an initial image. There may be a case where the design data D0 acquired by the design data acquisition part 20a is directly subjected to the display RIP development on the basis of the initial parameter and displayed in the processing area display screen 81a of the operation GUI 80a.

Subsequently, a mode is set (Step S102). Specifically, when the operator selects one of a plurality of modes in the mode setting field 230 of the operation GUI 80a, the mode setting part 31 sets the selected mode to a mode for comparing the specified parameter Pa1 with the reference parameter Pa2.

Subsequently, the processing area setting part 25a sets the processing area RT in accordance with the manipulation made by the operator through the operation part 96 (Step S103). Specifically, the operator makes manipulation while watching the pattern area displayed in the processing area display screen 81a, to thereby display an area to be checked in the processing area display screen 81a. At that time, when the operator intends to check the partial area, the operator makes manipulation for enlargement, to thereby display a partial image, being enlarged to allow a minute check of the line width or the shape. The processing area setting part 25a sets the area which is currently displayed, as the processing area RT.

Subsequently, when the operator inputs the specified parameter Pa1 into the parameter setting screen 82a of the operation GUI 80a, the specified parameter setting part 22a sets the inputted contents as the specified parameters Pa1 (Step S104). Herein, at the point in time when the input of the specified parameters Pa1 into the operation GUI 80a is completed or by clicking of the "Save" key 214, a set of the specified parameters Pa1 is stored in the specified parameter storage part 23a.

Then, the reference parameter Pa2 is set by the reference parameter setting part 24a (Step S105). Specifically, the reference parameter setting part 24a reads a set of RIP parameters in accordance with the set mode from the specified parameter storage part 23a and sets the set of RIP parameters as the reference parameter Pa2. Particularly, in a case where the set mode is the limiting apparatus emphasis mode, when the specified parameter Pa1 is set, the reference parameter Pa2 is generated on the basis of the specified parameter Pa1 which is set. In a case where the set mode is any mode other than the limiting apparatus emphasis mode, when the mode is set, a set of RIP parameters in accordance with the set mode may be read out from the specified parameter storage part 23a, to be set as the reference parameter Pa2.

When the specified parameter Pa1 is inputted and the "Update View" key 213 of the parameter setting screen 82a is clicked by the operator, with this as a trigger, the display RIP development part 26a immediately performs the display RIP development (Step S106). Specifically, the display RIP development part 26a performs the display RIP development of a portion corresponding to the processing area RT by using the specified parameter Pa1, to thereby acquire the specified image D21, and also performs the display RIP development of a portion corresponding to the processing area RT by using the reference parameter Pa2, to thereby acquire the reference image D23.

The display RIP development is performed with a resolution in accordance with the display magnification of the processing area RT in the processing area display screen 81a. Specifically, when the display magnification is relatively high, in other words, when the display object portion which is the processing area RT is a partial area of the pattern area and the partial area is displayed, being enlarged, in the processing area display screen 81a, the display RIP development is performed with relatively high resolution.

Further, for example, when the display magnification is relatively low, in other words, when the display object portion which is the processing area RT is an entire area of the pattern area and the entire area is displayed, being reduced, in the processing area display screen 81a, the display RIP development is performed with relatively low resolution. In other words, the resolution of the RIP development in the case where the processing area RT is the entire area of the pattern area is lower than that in the case where the processing area RT is the partial area of the pattern area.

Thus, since the display RIP development is performed restrictively on part of the design data D0 in the case where the processing area RT corresponds to the partial area of the pattern area and the display RIP development is performed coarsely in the case where the processing area RT corresponds to the entire area of the pattern area, the display RIP development is RIP development in which the amount of processed data is smaller than that in drawing RIP development.

In the specified image D21 and the reference image D23, each of pixels to be drawn in these images is given a logical value of "1", then, the common portion (overlap) between the specified image D21 and the reference image D23 can be specified as a logic synthesis image obtained by calculating respective logical products of corresponding pixels.

The difference extraction part 27 extracts the difference S between the specified image D21 and the reference image D23 (Step S107). Specifically, the difference S can be extracted by subtracting the reference image D23 from the specified image D21 by the pixel.

Then, the difference emphasis display part 28 displays the extracted difference S in the processing area display screen 81a so that the difference S overlaps the specified image D21 and the reference image D23. Specifically, the specified image D21, the reference image D23, and the difference S are compositely displayed in the same screen area while being aligned with one another.

At that time, the difference S is displayed in a display color different from that of the specified image D21 and reference image D23. Further, a portion of the difference S having a positive value and another portion of the difference S having a negative value are displayed in different display colors. Thus, the difference S is displayed in a visually emphasized manner (Step S108).

More specifically, for example, in a background displayed in black, a common portion (overlap) between the specified image D21 and the reference image D23 is displayed in a standard color (for example, white), the portion of the difference S having a positive value is displayed in red-based color and the portion of the difference S having a negative value is displayed in blue-based color. The four types of portions, i.e., the background (not-drawn portion), the common portion, the increased portion, and the decreased portion, are thereby displayed in different visual aspects. Thus, by displaying the background and the common portion in achromatic colors and the difference S (increased portion and decreased portion) in chromatic colors, the difference S is visually emphasized.

Further, the above-discussed display manner may be others only if the difference S is visually distinguished from the other portion (background and common portion). For example, in order to emphasize the difference S more, the difference S may be displayed in an intermittently flashing manner, or the like.

FIG. 15 shows images (hereinafter, referred to as "difference display images D24") in which the specified image D21, the reference image D23, and the difference S are displayed in various comparison modes. In each of the images shown in FIG. 15, the processing area RT is displayed as the partial area of the pattern area. Herein, the difference extraction is performed by subtracting pixels of the specified image D21 from the corresponding pixels of the reference image D23.

In an upper stage of FIG. 15, shown are the specified image D21, the reference image D23, and the difference display image D24 in the limiting apparatus emphasis mode (ST11). Since the minimum run-length is set, an area (fill area) in which a clearance between pixels is filled is partially formed in the specified image D21. On the other hand, in the reference image D23, since the minimum run-length is zero, no fill area is formed. Therefore, in the difference display image D24, the fill area is highlighted as the difference Sa (for convenience of illustration, the difference Sa is shown as a satin-finished area).

In a middle stage of FIG. 15, shown are the specified image D21, the reference image D23, and the difference display image D24 in the previous condition comparison mode or default comparison mode (ST12). Herein, there is a difference in the value of the line width between the specified parameter Pa1 and the reference parameter Pa2. Therefore, in the difference display image d24, a portion having a difference in the line width is highlighted as the difference Sb, being distinguished from the others (for convenience of illustration, the difference Sb is shown as a hatched area).

In a lower stage of FIG. 15, shown are the specified image D21, the reference image D23, and the difference display image D24 in the parameter adjustment mode (ST13). Herein, there is a difference in whether an edge exposure area ER is formed or not between the specified parameter Pa1 and the reference parameter Pa2. In the reference image D23, shown is the processing area RT in which no edge exposure area ER is formed in a portion inside the substrate. On the other hand, in the specified image D21, shown is the processing area RT in which an edge exposure area ER is formed in the portion inside the substrate. Therefore, in the difference display image D24, the inside portion in which the edge exposure area ER is formed is highlighted as the difference Sc (for convenience of illustration, the difference Sc is shown as a satin-finished area).

The differences Sa and Sc are differences S due to that some pixels in the specified image D21 are larger than the corresponding pixels in the reference image D23, i.e., a portion having increased exposure range, and the difference Sb is difference S due to that some pixels in the specified image D21 are smaller than the corresponding pixels in the reference image D23, i.e., a portion having decreased exposure range. Therefore, the differences Sa and Sc are displayed in a color different from that of the difference Sb.

After the process for displaying the difference S in an emphasized manner, it is determined whether or not the processing area RT should be set again, causing the display RIP development to be performed again (Step S109). The display area of the processing area display screen 81a is changed and the processing area RT is newly set (Step S110), and the display RIP development is performed again.

After the process for displaying the difference S in an emphasized manner, it is determined whether or not the specified parameter Pa1 should be set again, causing the display RIP development to be performed again (Step S111). When the operator judges that the difference S will affect the quality of the exposure in the drawing performed by the drawing apparatus 3 and inputs a change of the specified parameter Pa1, the specified parameter Pa1 is updated and the display RIP development is performed again.

The operator updates the specified parameter Pa1 or the processing area RT in various ways and visually checks the display images while updating the display image with the difference emphasized. Then, when an optimum display image can be obtained, the operator inputs an instruction that the value of the specified parameter Pa1 giving the display image should be determined as the RIP parameter to be used for the drawing RIP development. When the instruction input is received, the specified parameter storage part 23a reads the specified parameter Pa1 which is determined and transmits the specified parameter Pa1 to the transmitting part 30a as a RIP parameter to be used for the drawing RIP development. The transmitting part 30a transmits the acquired RIP parameter to the drawing apparatus 3.

Thus, the display RIP development, the difference extraction, and the difference emphasis display are performed in real time every time when the specified parameter Pa1 is newly set or the processing area RT is newly set.

Thus, in response to the update of the specified parameter Pa1 or the update of the processing area RT, the display RIP development is performed again and the display in the processing area display screen 81a is updated in real time, and it is therefore possible to adjust the specified parameter Pa1 and the like while monitoring the change of the image substantially in a dynamic manner. The real time in this case, however, includes not only the operation in response to the update of the specified parameter Pa1 or the update of the processing area RT but also the display RIP development and the update of the display which are performed when the operator gives an update command after the update of the specified parameter Pa1 or the update of the processing area RT. In other words, since it is possible to perform the update of the parameters and the check of the result without requiring the time for the drawing RIP development, the apparatus of the second preferred embodiment can perform a real-time processing.

Thus, in the image processing apparatus 2a of the second preferred embodiment, the display RIP development in which the amount of processed data is smaller than that in drawing RIP development is performed as the RIP development. Further, the difference S between the specified image D21 obtained by the display RIP development on the basis of the specified parameter Pa1 and the reference image D23 obtained by the display RIP development on the basis of the reference parameter Pa2 is displayed in the processing area display screen 81a, being visually distinguished. Therefore, it is possible to rapidly perform the display RIP development and suppress missing the difference S between the specified image D21 and the reference image D23.

Furthermore, since the difference S is displayed, being more visually emphasized than the common portion between the specified image D21 and the reference image D23, it is possible to more visually distinguish the difference S from the common portion. This suppresses missing the difference S.

The display RIP development is performed in response to the update of the specified parameter Pa1 and the display of the image in the processing area display screen 81a is updated. In other words, since the image can be checked in real time, it is possible to suppress the time loss required for the display of the difference S. Therefore, it is possible to easily set the specified parameter Pa1 and the processing area again and check the difference S.

Especially in a substrate having a fine pattern and a wide drawing area, since the drawing RIP development requires time, the time loss due to wrong setting of the RIP parameter becomes a big problem. Further, since the pattern is fine, it is likely to miss the difference and it therefore takes time to perform a check. The image processing apparatus 2a can resolve these problems.

When the processing area RT is a partial area of the pattern area, the RIP development is performed with relatively high resolution, and when the processing area RT is an entire area of the pattern area, the RIP development is performed with relatively low resolution. Therefore, it is possible to rapidly perform the display RIP development.

The reference parameter Pa2 is set in accordance with one mode selected out of a plurality of modes. Therefore, it is possible to set the reference parameter Pa2 in accordance with the purpose of comparison between the specified parameter Pa1 and the reference parameter Pa2.

The specified image D21, the reference image D23, and the difference S are compositely displayed in the processing area display screen 81a, being aligned with one another. Therefore, it is possible to easily recognize the position of the difference S on the image.

The display color of the difference S in the processing area display screen 81a is different from the display colors of the specified image D21 and the reference image D23. Therefore, it is possible to easily make a visual check of the difference S.

The display color of the difference S having a positive value is different from that of the difference S having a negative value. Therefore, it is possible to easily distinguish whether the difference S is a difference due to an increase in the exposure range or a difference due to a decrease in the exposure range.

Other Preferred Embodiment

The apparatuses of the above-discussed preferred embodiments are assumed to be a light beam direct drawing apparatus for manufacturing precision electronic substrates such as semiconductor substrates, substrates for flat panel display (FPD), printed circuit boards, and the like. The present invention, however, can be applied to direct drawing in the fields of printing and the like. Further, the present invention can be applied to electron beam direct drawing apparatus, instead of the light beam direct drawing apparatus.

While the invention has been shown and described in detail, the foregoing description is in all aspects illustrative and not restrictive. It is therefore understood that numerous modifications and variations can be devised without departing from the scope of the invention.

What is claimed is:

1. An image display device for direct drawing apparatus for performing direct drawing of a predetermined pattern on a drawing object by scanning with a drawing beam, comprising:
    an acquisition part for acquiring design data in a vector format describing said pattern;
    a specified drawing raster image processing (RIP) parameter setting part for setting a specified drawing RIP parameter to be used for drawing RIP development of said design data;
    a processing area setting part for setting a display object portion of said design data to be subjected to said drawing RIP development as a processing area;
    a display RIP development part for performing display RIP development of a portion of said design data, which corresponds to said processing area, by using said specified drawing RIP parameter, to thereby obtain a specified image; and
    a display part for visibly displaying said specified image,
    wherein:
        said display RIP development performed by said display RIP development part is a RIP development in which the amount of processed data is smaller than that in said drawing RIP development for said direct drawing,
        said display RIP development part performs RIP development of said portion corresponding to said processing area by using said specified parameter, to thereby obtain said specified image and also performs RIP development of said portion corresponding to said processing area by using a predetermined reference parameter, to thereby obtain a reference image, and
        a display part visibly displays said specified image and said reference image, overlapping each other and displays a difference between said specified image and said reference image, being visually distinguished from a common portion between said specified image and said reference image.

2. The image display device for direct drawing apparatus according to claim 1, wherein
    in response to update of said specified parameter, said display RIP development is performed and display content on said display part is updated.

3. The image display device for direct drawing apparatus according to claim 1, wherein
    said display RIP development part performs said display RIP development with first resolution when said processing area corresponds to a partial area of said pattern and performs said display RIP development with second resolution when said processing area corresponds to an entire area of said pattern, and
    said second resolution is lower than said first resolution.

4. The image display device for direct drawing apparatus according to claim 1, wherein
    said specified image obtained by said display RIP development is displayed on said display part, being aligned with a pattern corresponding to said design data.

5. The image display device for direct drawing apparatus according to claim 1, wherein said processing area is set with said pattern displayed on said display part.

6. The image display device for direct drawing apparatus according to claim 1, wherein
    said display part displays said difference, being more visually emphasized than said common portion.

7. The image display device for direct drawing apparatus according to claim 1, further comprising:
    a mode setting part for setting one mode out of a plurality of modes on determination of said reference parameter; and
    a reference parameter setting part for setting said reference parameter in accordance with said one mode which is set.

8. The image display device for direct drawing apparatus according to claim 1, wherein
    said specified image, said reference image, and said difference are compositely displayed in one screen area, being aligned with one another.

9. The image display device for direct drawing apparatus according to claim 8, wherein
    a display color of said difference on said display part is different from respective display colors of said specified image and said reference image.

10. The image display device for direct drawing apparatus according to claim 9, wherein
    a display color of said difference having a positive value is different from that of said difference having a negative value.

11. The image display device for direct drawing apparatus according to claim 1, further comprising:
    a specified drawing RIP parameter storage part for storing a specified drawing RIP parameter set in said specified drawing RIP parameter setting part,
    wherein said specified drawing RIP parameter used for said display RIP development is stored in said specified drawing RIP parameter storage part as a specified parameter used for drawing RIP development in said direct drawing apparatus.

12. The image display device for direct drawing apparatus according to claim 1, wherein
    said display RIP development part performs said display RIP development with a resolution lower than that for said drawing RIP development so that said amount of processed data is smaller than an amount of processed data in said drawing RIP development.

13. The image display device for direct drawing apparatus according to claim 1, wherein
    said display RIP development part performs said display RIP development only for a partial pattern area, not an entire pattern area, so that said amount of processed data is smaller than an amount of processed data in said drawing RIP development.

14. A tangible and non-transitory computer readable recording medium for recording a program which can be read by a computer provided with a display screen,
    said computer reading said program and causing a CPU thereof to execute said program by using a memory, to thereby serve as an image display device for direct drawing apparatus for performing direct drawing of a predetermined pattern on a drawing object by scanning with a drawing beam,
    wherein said image display device comprises:
        an acquisition part for acquiring design data in a vector format describing said pattern;
        a specified drawing raster image processing (RIP) parameter setting part for setting a specified drawing RIP parameter to be used for drawing RIP development of said design data;
        a processing area setting part for setting a predetermined display object portion of said design data to be subjected to said drawing RIP development as a processing area;

a display RIP development part for performing display RIP development of a portion of said design data, which corresponds to said processing area, by using said specified drawing RIP parameter, to thereby obtain a specified image; and a display part for visibly displaying said specified image on said display screen, wherein:

said display RIP development performed by said display RIP development part is a RIP development in which the amount of processed data is smaller than that in said drawing RIP development for said direct drawing, said display RIP development part performs RIP development of said portion corresponding to said processing area by using said specified parameter, to thereby obtain said specified image and also performs RIP development of said portion corresponding to said processing area by using a predetermined reference parameter, to thereby obtain a reference image, and a display part visibly displays said specified image and said reference image, overlapping each other, on said display screen, and displays a difference between said specified image and said reference image, being visually distinguished from a common portion between said specified image and said reference image.

* * * * *